(12) United States Patent
Yen

(10) Patent No.: US 12,194,381 B2
(45) Date of Patent: Jan. 14, 2025

(54) SYSTEMS AND METHODS FOR CREATING A NON-CURATED VIEWING PERSPECTIVE IN A VIDEO GAME PLATFORM BASED ON A CURATED VIEWING PERSPECTIVE

(71) Applicant: Adeia Guides Inc., San Jose, CA (US)

(72) Inventor: Bruce Yen, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 248 days.

(21) Appl. No.: 17/835,129

(22) Filed: Jun. 8, 2022

(65) Prior Publication Data

US 2023/0056898 A1     Feb. 23, 2023

Related U.S. Application Data

(63) Continuation of application No. 16/971,268, filed as application No. PCT/US2018/019465 on Feb. 23, 2018, now Pat. No. 11,383,164.

(51) Int. Cl.
| | | |
|---|---|---|
| *A63F 13/5252* | (2014.01) | |
| *A63F 13/335* | (2014.01) | |
| *A63F 13/5255* | (2014.01) | |
| *A63F 13/86* | (2014.01) | |

(52) U.S. Cl.
CPC ........ *A63F 13/5252* (2014.09); *A63F 13/335* (2014.09); *A63F 13/5255* (2014.09); *A63F 13/86* (2014.09)

(58) Field of Classification Search
CPC .............. A63F 13/5252; A63F 13/335; A63F 13/5255; A63F 13/86; A63F 13/60; A63F 13/65; A63F 2300/538; A63F 2300/60

USPC .......................................... 463/31
See application file for complete search history.

(56) References Cited

U.S. PATENT DOCUMENTS

| | | | |
|---|---|---|---|
| 6,239,794 B1 | 5/2001 | Yuen et al. | |
| 6,557,041 B2 * | 4/2003 | Mallart | H04N 7/15 348/E7.083 |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| (Continued) | | | |

OTHER PUBLICATIONS

PCT International Search Report and Written Opinion for International Application No. PCT/2018/019465, dated Nov. 12, 2018 (19 pages).

*Primary Examiner* — Allen Chan
(74) *Attorney, Agent, or Firm* — Haley Guiliano LLP

(57) ABSTRACT

Systems and methods are described for creating a non-curated viewing perspective in a video game platform based on a curated viewing perspective. For example, a user may be viewing a gameplay video of a video game. The user may be interested in viewing the same gameplay from a different perspective in the video game. Accordingly, a media guidance application may identify the video game in the video and retrieve video game engine data associated with the video game, to replicate, on a video game console, the gameplay depicted in the video. The user may be able to change the perspective (e.g., in-game position of the camera and the camera angle) within the replicated video game platform, via user commands. In response to receiving a user command to change the curated viewing perspective to a non-curated viewing perspective, the media guidance application may re-render the gameplay from the non-curated viewing perspective.

20 Claims, 14 Drawing Sheets

(56) References Cited

U.S. PATENT DOCUMENTS

| | | | |
|---|---|---|---|
| 8,025,572 B2 | 9/2011 | Spanton et al. | |
| 8,046,801 B2 | 10/2011 | Ellis et al. | |
| 8,628,424 B1 | 1/2014 | Kern et al. | |
| 9,333,433 B2* | 5/2016 | Cotter | H04L 69/04 |
| 9,352,215 B2* | 5/2016 | Ikenaga | A63F 13/86 |
| 9,573,062 B1* | 2/2017 | Long | G11B 27/00 |
| 9,968,856 B1 | 5/2018 | Ninoles et al. | |
| 10,484,439 B2* | 11/2019 | Oates, III | A63F 13/86 |
| 2002/0174430 A1 | 11/2002 | Ellis et al. | |
| 2005/0251827 A1 | 11/2005 | Ellis et al. | |
| 2007/0117617 A1 | 5/2007 | Spanton et al. | |
| 2010/0153885 A1 | 6/2010 | Yates | |
| 2010/0167809 A1 | 7/2010 | Perlman et al. | |
| 2012/0004042 A1 | 1/2012 | Perry et al. | |
| 2012/0086631 A1 | 4/2012 | Osman et al. | |
| 2014/0057722 A1 | 2/2014 | Justice et al. | |
| 2016/0361658 A1 | 12/2016 | Osman et al. | |
| 2017/0011554 A1 | 1/2017 | Burba et al. | |

\* cited by examiner

SYSTEMS AND METHODS FOR CREATING A NON-CURATED VIEWING PERSPECTIVE IN A VIDEO GAME PLATFORM BASED ON A CURATED VIEWING PERSPECTIVE

CROSS-REFERENCE TO RELATED APPLICATIONS

This application is a continuation of U.S. patent application Ser. No. 16/971,268, filed Aug. 19, 2020, which is a national stage application under 35 U.S.C. § 371 of International Application PCT/US2018/019465, filed Feb. 23, 2018, which are hereby incorporated by reference herein in their entireties.

BACKGROUND

The modern advancements in gaming technology such as improved hardware capabilities and robust software techniques have increased the popularity and accessibility of video games. In addition to actually playing video games, users like to share gameplay content such as videos of tutorials, game mechanics, and tournaments. Accordingly, users consuming this gameplay content may desire to customize their experience by viewing the gameplay content through different perspectives within the video game. Conventional systems in different media ecosystems allow users to switch between predetermined camera angles/perspectives. However, conventional systems do not allow the user to select any arbitrary position in a video game environment and view gameplay from the user-selected perspective.

SUMMARY

Systems and methods are thus described for creating a non-curated viewing perspective in a video game platform based on a curated viewing perspective. The non-curated viewing perspective may be associated with the user-selected camera angle and in-game position; the curated viewing perspective may be associated with the camera angle and in-game position of the original video the user is viewing. For example, the user may be viewing a gameplay video of the video game "Tennis World Tour 2018," on a streaming website such as YouTube. The user may be interested in viewing the same gameplay from a perspective in the video game that is different from the perspective of the YouTube video. Accordingly, a media guidance application may identify the video game in the YouTube video and retrieve video game engine data associated with the game. Suppose the video game can be played on a video game console such as the PlayStation 4. In response to determining that the user has access to a PlayStation 4, the media guidance application may replicate the gameplay depicted in the YouTube video on the PlayStation 4 using the video game engine data. The user may be able to change the perspective (e.g., in-game position of the camera and the camera angle) within the replicated video game platform, via user commands. In response to receiving a user command to change the curated viewing perspective to a non-curated viewing perspective, the media guidance application may re-render the gameplay from the non-curated viewing perspective.

In some aspects, the media guidance application may receive, at user equipment, a first stream of video contents that is depicted using a curated viewing perspective of a video game environment that is simultaneously transmitted to a plurality of user equipment. The first stream of video contents may be any video that depicts video game gameplay. For example, the first stream may be a video sent to the user, a video uploaded to a streaming website such as YouTube (e.g., "let's play format"), or an in-game tutorial. Suppose the user is viewing a live stream gameplay video of a tennis simulation game (e.g., Tennis World Tour 2018) via a streaming website such as YouTube. The first stream may depict the video game environment as rendered by a video game console (e.g., a PlayStation 4). The rendered content that makes up the video game environment may include game objects such as player models, the tennis stadium, the court, the tennis net, the ball, etc. The video game environment may include visible game mechanics (e.g., the movement of the characters and the ball) and audio information. The curated viewing perspective may comprise a camera angle and an in-game viewing position. For example, traditionally in tennis simulation games, the in-game viewing position is an elevated position behind a first tennis player. The in-game viewing position allows the camera angle (e.g., a viewing field directed in a particular direction) to capture the entire court and the second tennis player on the opposite side.

The media guidance application may receive video game engine data simultaneously with the first stream. The video game engine data refers to all information that is needed to render the content of the video game. This information may include code, datasets, graphics, audio, etc. In addition, the video game engine data may include information about the game such as the title, genre, creator names, developer names, game format, release date, etc. In some embodiments, the video game engine data may include the input video game commands that were executed to create the video game gameplay depicted in the first stream. For example, alongside the live stream gameplay video on YouTube, the user may simultaneously receive at user equipment from a third-party content provider, downloadable metadata files comprising of video game engine data which includes real-time executed commands. These commands may include moving the virtual tennis player around the court and hitting the ball. In some embodiments, the media guidance application may also receive audio or text commentary associated with the first stream. The audio or text commentary may be received separately from video and the video game engine data.

The media guidance application may determine a video game associated with the video game environment and the video game engine data. For example, the media guidance application may determine from the video game engine data, that the name of the video game associated with the video game environment is "Tennis World Tour 2018." In the case that the video game engine data does not include the name of the video game, the media guidance application may retrieve a frame of the first stream (e.g., via screen capture) depicting the video game environment and may apply imaging processes (e.g., coefficient of correlation calculation, and keypoint matching) to compare with gameplay images on the Internet or in a video game database. In response to determining a match (e.g., using correlation techniques) to an image on the Internet or in the video game image database, the media guidance application may determine the name of the video game associated with the matched image. For example, the video game database may contain images of gameplay for a plurality of video games and group/classify each image based on the name of the respective video game.

In some embodiments, in order to determine the video game, the media guidance application may retrieve a first identifier associated with the video game environment and a second identifier associated with the video game engine data. The first identifier and second identifier may be metadata such as a keyword, an image, a title, an audio clip, a game object, code, etc. The media guidance application may search the video game database comprised of metadata associated with a plurality of video games, for an entry of the video game that is associated with both the first identifier and the second identifier. Furthermore, the video game database may include entries of various video games. For each entry, the video game database may include metadata such as title, developer, release date, genre, associated characters, graphics, audio clips, and game code. For example, the media guidance application may search for the first and second identifiers, which may be a screenshot and a game title, respectively. The media guidance application may perform image processing (e.g., keypoint matching), sound processing (e.g., sound matching) or textual comparisons to identify metadata in the video game database that correspond to the first and second identifiers. In some embodiments, the media guidance application may compare the correspondence, which may be a quantitative or a qualitative value, to a predetermined threshold. If the correspondence between the metadata and at least one of the first identifier or second identifier is greater than or equal to the threshold, the media guidance application may determine that the first and second identifiers correspond to the metadata for a particular entry of a video game. In some embodiments, the threshold may vary based on the metadata that is being compared. For example, an audio sample comparison may be associated with a threshold at 80% (e.g., the samples being compared should have at least an 80% correlation), whereas a textual comparison of a game title may be associated with a threshold at 100% (e.g., the titles need to match exactly). Accordingly, the media guidance application may determine the video game associated with the video game environment and the video game engine data, based on the matched entry in the video game database.

In some embodiments, the media guidance application may simply request the user to identify the video game by generating for display an input prompt and allowing the user to identify the video game through text, voice commands or gestures. The media guidance application may also display several identifiers of candidate video games and allow the user to pick the video game identifier that matches the video game in the first stream.

The media guidance application may determine the video game platform that supports the video game engine data associated with the video game. The video game platform may be an actual video game console (e.g., PlayStation 4, Xbox One, PC, etc.) or an emulator that can imitate the functionality of a video game console. Based on the video game engine data or the metadata of the first stream, both of which may include information about the video game console used in gameplay, the media guidance application may identify a compatible emulator or video game console as the video game platform. The media guidance application utilizes the video game platform and the video game engine data to recreate the video game in the first stream.

The media guidance application may then determine whether the video game and the video game platform are accessible to the user equipment. For example, the media guidance application may refer to the user profile to determine whether the user has access to the video game console and/or the video game. Suppose that the live stream the user is watching features the game "Tennis World Tour 2018," as played on the PlayStation 4. Based on the user profile, the media guidance application may determine that the user equipment has access to both the PlayStation 4 and "Tennis World Tour 2018." In some embodiments, the video game engine data may be compatible with multiple video game consoles. For example, a game such as "Tennis World Tour 2018" is compatible with the PlayStation 4 and the Xbox One. Even if the user does not have access to the PlayStation 4, the media guidance application may determine that the user equipment has access to the Xbox One and an alternate version of "Tennis World Tour 2018" that is compatible with the Xbox One. In some embodiments, the media guidance application may determine that the user equipment has access to an emulator on a video game platform (e.g., a personal computer) different from the one specified in the metadata (e.g., a PlayStation 4). The emulator on the personal computer may be able to emulate the functionality of the PlayStation 4. In addition, the media guidance application may determine that the user equipment has access to an alternate version of "Tennis World Tour 2018" that is compatible with the emulator. In response, the media guidance application may determine that the video game and video game platform can be accessed by the user equipment.

In response to determining that the video game and the video game platform are not accessible to the user equipment, the media guidance application may generate, for display, the first stream of video contents that is depicted using the curated viewing perspective. In this embodiment, the media guidance application may determine that the user equipment does not have resources (e.g., the video game and/or the video game platform) to replicate, in the video game platform, the video contents of the first stream. In some embodiments, the media guidance application may generate for display an option to purchase or rent a version of the video game, the video game platform, a light playback client, and/or an emulator of the video game platform. In some embodiments, the media guidance application may refer to the user profile to identify a friend (e.g., via social media) associated with the user who has access to the video game and/or the video game platform. In response, the media guidance application may generate for display an option for the user to request the video game and/or the video game platform from the user's friend. If the user accepts the option, the media guidance application may send a request for the video game and/or the video game platform to the user's friend. If the user's friend accepts, the media guidance application may retrieve the video game and/or an emulator associated with the video game platform.

The media guidance application may then process the video game engine data to generate a second stream comprising a replication of the video contents that is viewable within a video game platform. The media guidance application may use the video game engine data to identify the game objects rendered in the video game environment, as depicted in the first stream. For example, the video game engine data may provide a predetermined list of game objects, graphics, positions, mechanics and audio associated with each frame of the first stream. If the video game engine data does not provide this information for each frame of the first stream, the media guidance application may utilize objection recognition to identify objects in the first stream and compare them to the video game engine data.

For example, in some embodiments, the media guidance application may capture a fingerprint of the video contents of the first stream. The fingerprint of the video contents may be an image capture of a set of frames of the video contents. The fingerprint may include an audio clip associated with the set of frames. The fingerprint may also take include input video game commands associated with the gameplay in the set of frames. As discussed previously, these input video game commands may be retrieved from the video game engine data. The media guidance application may then determine a set of characteristics associated with the fingerprint. For example, the media guidance application may use object recognition to identify objects in the set of frames. These objects may include the tennis players, the court, the net, the tennis ball, etc. The media guidance application may also perform sound recognition to isolate various sounds in the audio clip. For example, the sounds may be of the tennis ball being hit, the crowd, the players, the commentators, etc. In some embodiments, the audio associated exclusively with the video game in the first stream may be received as a part of the video game engine data. For example, the audio of the first stream may include the video game audio (e.g., tennis ball being hit, the crowd, etc.) and additional overlaid audio (e.g., voices of the players, interviews, tournament hosts, etc.). The video game audio may be retrieved separately from the first stream, thus allowing the media guidance application to differentiate sounds that are overlaid, from sounds associated with the video game audio. In some embodiments, the user may select to remove the overlaid audio (e.g., the commentary of the player in the first stream) in order to add his/her own commentary/analysis.

In some embodiments, the media guidance application may perform object recognition on a frame of the first stream to identify a dimensional space. The media guidance application may determine whether the first stream is depicting a three-dimensional space (e.g., a tennis court) or a two-dimensional space (e.g., a side scrolling environment such as in Super Mario World). In order to identify the dimensional space, the media guidance application may utilize a combination of computer vision and machine learning. More specifically, the media guidance application may use the frame of the first stream as an input to a machine learning algorithm that outputs a depth map. The machine learning algorithm may be pre-trained using a variety of images and dimensional data associated with the images. An algorithm trained to identify how objects in an image appear, based on the dimensions of the space depicted in the image, may output the identity of the dimensional space. For example, the algorithm, as implemented by the media guidance application, may detect features such as the position of various objects in the frame and determine a depth map accordingly. If the depth map is described in three dimensions (e.g., via an x-coordinate, a y-coordinate and a z-coordinate), the media guidance application may determine that the dimensional space is three-dimensional. If the depth map is described in two dimensions (e.g., via an x-coordinate and a y-coordinate), the media guidance application may determine that the dimensional space is two-dimensional.

The media guidance application may then perform object recognition on the frame of the first stream to identify the object of the plurality of objects. For example, the media guidance application may utilize image processes such as segmentation to identify pixels in the frame that can be grouped to form an object. In response to segmenting the frame, the media guidance application may compare the segmented pixels to images in an image database stored in memory or in a remote server. The image database may contain images of various objects and identify them with names. For example, the media guidance application may segment a group of pixels in the frame of the first stream that form a tennis ball. The media guidance application may compare those segmented pixels to the images in the image database and determine a correspondence with an image of a tennis ball. In response to determining the match, the media guidance application may classify the segmented pixels based on the name of the image that matched the segmented pixels.

The media guidance application may determine the location of the object of the plurality of objects with respect to a virtual viewing position in the dimensional space. For example, the media guidance application may utilize the depth map discussed previously to determine the positions of the objects relative to each other. For example, the depth map may indicate that the first tennis player is at an arbitrary position (1, 2, 1) and the second tennis player is at (−5, 2, 5). These values indicate that the second tennis player is 6 units to the left and 4 units ahead of the first tennis player. As mentioned previously, these units may be arbitrary (e.g., virtual inches, meters, pixels, etc.). The y-coordinate signifies that both tennis players are at the same elevation.

In some embodiments, the media guidance application may determine whether a set of characteristics, wherein the set of characteristics comprises a dimensional space, an object of a plurality of objects, and a location of the object of the plurality objects, associated with the fingerprint corresponds with a set of game elements in the video game engine data.

For example, in some embodiments, the media guidance application may search the video game engine data for a virtual game space that matches the dimensional space. For example, in response to determining that the first stream is associated with a three-dimensional space, the media guidance application may search the video game engine data for code that describes three-dimensional objects and environments. In response to determining that the video game engine data is associated with three-dimensional objects and rendering, the media guidance application may determine that the virtual game space of the video game is expressed in three dimensions.

The media guidance application may then search the video game engine data for a game object that matches the object of the plurality of objects. For example, the media guidance application may label the object with an identifier such as "tennis player one." In some embodiments, the media guidance application may associate additional details with tennis player one. For example, the media guidance application may recognize that tennis player one is Roger Federer and is wearing a blue shirt with black shorts. The game elements in the video game engine data may be graphics, audio, game code, etc. The media guidance application may determine whether there are any game elements associated with Roger Federer in the video game engine data. For example, the media guidance application may identify code in the video game engine data that can render Roger Federer in the virtual game space. The code may also reference the black shirt and black shorts attire, audio clips of Roger Federer, game mechanics that are associated with his movement, etc., which are also found in the video game engine data. Accordingly, the media guidance application may determine that object "tennis player one" is associated with a specific game element (e.g., game code) that can be used to render an in-game version of the object.

In response to identifying the virtual game space and the game object in the video game engine data, the media guidance application may determine a set of game coordinates of the game object in the virtual game space based on the location/position of the object of the plurality of objects. As discussed previously, the positions of the objects in the plurality of objects are relative to any arbitrary object (e.g., tennis player one) identified in the first stream. In order to determine game coordinates, the media guidance application may first retrieve the virtual viewing position from the video game engine data. For example, video game engine data may indicate a default virtual viewing position that the game initializes the video game environment around. In addition, the media guidance application may determine the default position of a game object such as tennis player one. The media guidance application may determine the displacement between the game object and the virtual viewing position. Suppose that the virtual viewing position is at an origin (0, 0, 0) and the game object is at the coordinate (0, −15, 20). This signifies that when the video game is normally rendered, tennis player one is always 15 units below and 20 units ahead of the virtual viewing position. Using the locations/positions of the plurality of objects relative to the object "tennis player one" in the first stream, the media guidance application may calculate the game coordinates of the game objects relative to the game object, tennis player one. For example, if the virtual displacement between tennis player one and tennis player two is (−1, 0, 40) in the first stream, the media guidance application may determine that the displacement between the respective game objects is proportional to (−1, 0, 40) in the virtual game space.

The media guidance application may then determine a video refresh rate of the first stream. For example, the media guidance application may refer to the metadata of the first stream to determine the amount of frames per unit time (e.g., per second) transmitted in the first stream. The media guidance application may determine a game refresh rate based on the video refresh rate. For example, the media guidance application may retrieve a refresh rate in the video game engine data. This refresh rate may indicate the amount of frames in a period of time that can be presented to a user accessing the video game (e.g. 60 Hz). The video refresh rate may be different from this refresh rate because of streaming conditions associated with receiving the first stream (e.g., 50 Hz). The media guidance application may thus determine a game refresh rate whose value is equal to one of the refresh rates or is between the two refresh rates (e.g., 45 Hz).

Accordingly, the media guidance application may render at the game refresh rate, within the video game platform, the game object at the set of game coordinates in the virtual game space. For example, the media guidance application may execute the game code provided in the video game engine data to render the game objects at their respective game coordinates. Furthermore, the media guidance application may monitor the first stream and re-render the game objects based on the game refresh rate. Thus, if the game refresh rate transmits 45 frames per second, the media guidance application may monitor for changes in the first stream for each frame and re-render accordingly.

The media guidance application may thus generate for display the video contents within the video game platform at the virtual viewing position and at a virtual viewing angle that matches the curated viewing perspective. The virtual viewing angle may be a vector that points in a specific direction in the virtual game space. For example, from the virtual viewing position (0, 0, 0), the vector may point to the coordinate (0, −15, 30) (e.g., the center of the virtual tennis net). Therefore, the virtual viewing angle focus the curated viewing perspective to the court. If the virtual viewing angle is associated with a vector pointing to the game coordinate (0, −15, −30), the curated viewing perspective may be focused in the opposite direction (e.g., towards the virtual audience in the stands behind the court).

The media guidance application may generate for display the video contents within the video game platform using the curated viewing perspective. The video contents of the second stream, unlike the first stream, are based in the video game platform. Therefore, the second stream is not simply a video and the user can interact with the second stream through user commands.

The media guidance application may receive input, at the user equipment, requesting to view the video contents from a non-curated viewing perspective. For example, in some embodiments, the media guidance application may receive a user-selected virtual viewing position in the video game platform of the second stream. The media guidance application may generate a virtual cursor that points to a game coordinate in the virtual game space. The user may move the virtual cursor to any arbitrary position in the virtual game space. For example, given that Tennis World Tour 2018 is a three-dimensional game, the media guidance application may receive a user-selected virtual viewing position when the user shifts the virtual cursor to the coordinates (4, 5, 2). These coordinates may be in arbitrary units (e.g., meters, inches, pixels, etc.).

The media guidance application may then determine a virtual displacement between the user-selected virtual viewing position and the curated virtual viewing position. For example, if the user-selected virtual viewing position is (4, 5, 2) and the curated virtual viewing position is (0, 0, 0), then the virtual displacement between the two points is (4, 5, 2) (e.g., the difference between each respective coordinate of the two positions). It should be noted that the displacement is associated with a vector that points to the user-selected virtual viewing position.

In some embodiments, the media guidance application may shift each game coordinate of the set of game coordinates by the virtual displacement. For example, the position of tennis player one is originally (10, −15, 20) with respect to the curated virtual viewing position. Upon shifting the position by the virtual displacement, the new position becomes (6, −20, 18). The position of the user thus remains stationary. However, all game objects and their respective positions are shifted by the virtual displacement.

In some embodiments, the media guidance application may shift a virtual viewing position of the user by the virtual displacement to the user-selected virtual viewing position. For example, the position of the user is originally (0, 0, 0) based on the curated virtual viewing position. Upon shifting the virtual viewing position by the virtual displacement, the new position becomes (4, 5, 2). The position of the game objects thus remains stationary.

The media guidance application may thus generate for display, using the video game engine data, the viewing contents from the non-curated viewing perspective. For example, the media guidance application may change the virtual position of the user and the camera angle based on the requested non-curated viewing perspective. Using the video game engine data, the media guidance application may re-render all game objects, audio, graphics and virtual environments associated with the first stream at a new set of positions with respect to the user's new virtual position. This allows the user to view the gameplay from a different perspective (e.g., the non-curated perspective).

In some embodiments, the media guidance application may receive a second input, at the user equipment, requesting to view the video contents from the curated viewing perspective. For example, the media guidance application may generate for display an option for the user to switch back to the curated viewing perspective. In this case, the user may select that option. In response to receiving the second input, the media guidance application may switch the video contents within the video game platform from the non-curated viewing perspective to the curated viewing perspective. For example, the media guidance application may re-render all game objects at respective game coordinates relative to the curated virtual viewing position.

In some embodiments, the media guidance application may receive an input at the user equipment, requesting to change additional overlaid audio in the first stream, to user commentary. For example, the media guidance application may retrieve the audio of the first stream and isolate the video game audio (e.g., the sounds associated with the game objects) from additional overlaid audio (e.g., the external sounds such as non-game music, player commentary, etc.). The media guidance application may create a second stream that does not include the additional overlaid audio and may allow the user to add his/her own audio (e.g., user commentary, user's selected music, etc.).

In some embodiments, the media guidance application may determine an amount of correspondence between the set of characteristics associated with the fingerprint with a set of game elements in the video game engine data. The amount of correspondence may be quantitative (e.g., a percentage, a fraction, a normalized correlation, etc.) or qualitative (e.g., "similar," "not similar," "exact match," "no match"). Suppose the set of characteristics comprise of graphics, audio files, and textual information. The set of game elements may comprise of mathematical models, graphics, audio, and text. The media guidance application may compare each characteristic with each game element and determine a respective amount of correspondence for each pair of characteristics and game elements. Suppose the amount of correspondence between a characteristic and a game element is 80%. The media guidance application may then determine whether the amount of correspondence is greater than a threshold. The threshold may be a predetermined value stored in memory. The threshold may also be a qualitative or quantitative value. For example, the threshold may be 70%. In response to determining that the amount of correspondence is greater than the threshold, the media guidance application may generate the second stream based on the set of game data. In response to determining that the amount of correspondence is less than the threshold, the media guidance application may generate for display the first stream of the video contents. In this case, the media guidance application is unable to match the characteristics of the first stream with the game elements in the video game engine data. Therefore, the media guidance application simply generates for display the first stream and does not attempt to generate the second stream.

In some embodiments, the media guidance application may receive a third request, at the user equipment, to make an alteration to the second stream in the video game platform. The user may request to change at least one of (1) a virtual viewing position, (2) a virtual viewing angle, (3) a game object, (4) a set of game coordinates of the game object, (5) a virtual game space, or (6) a game setting, all associated with the curated viewing perspective. For example, the user may be viewing gameplay of a tennis match in "Tennis World Tour 2018" from a non-curated viewing perspective. The non-curated viewing perspective may be associated with a virtual viewing position behind a billboard in the stadium. Therefore, the user may be unable to view the actual tennis players on the court. Using the virtual cursor, the user may be able to select various game objects in the virtual game space. Thus, the media guidance application may receive a selection of a game object such as the billboard. In response, the media guidance application may generate an option to either re-position the game object to new game coordinates, hide the game object, resize the game object, or save the game object to memory. The media guidance application may receive the user-selection of the option to hide the game object. In response, the media guidance application may re-render the virtual game space without rendering the selected game option (e.g., thus allowing the user to see "through walls").

In some embodiments, the media guidance application may identify non-gameplay portions in the first stream and may isolate the non-gameplay portions from the gameplay portions. The media guidance application may then generate the second stream based on the gameplay portions. For example, the media guidance application may determine that the frames of the first stream include a picture-in-picture of the players playing the video game depicted in the first stream. In response, the media guidance application may identify the remainder of the space in each frame that is not part of the picture-in-picture and solely analyze the identified space to determine game objects. The media guidance application may create the second stream accordingly, and regenerate, in the second stream, the picture-in-picture featuring the players from the first stream. The non-gameplay portion may also be audio. For example, the media guidance application may identify, using common volume techniques, speech patterns, voice recognition, and/or non-correlation with visual data, audio portions that are not from the gameplay. For example, this audio may be commentary from the players. In response, the media guidance application may regenerate and overlay the non-gameplay audio on the second stream. The media guidance application may refer to user preferences to determine whether to regenerate the non-gameplay portions in the second stream.

In some embodiments, the media guidance application may simultaneously generate for display the first stream and the second stream, in response to receiving a user request to present both streams for display. Suppose the user is viewing a video game tournament. The first stream may therefore switch between gameplay and non-gameplay sections (e.g., broadcast hosts talking, shots of the people playing the video game, etc.). The media guidance application may generate an option to lock on to the gameplay. In response to receiving a user selection to lock on to the gameplay, the media guidance application may continue rendering the video contents of the second stream, even if the first stream switches to a non-gameplay section. Accordingly, the user may also be interested in viewing from the curated viewing perspective and the non-curated viewing perspective simultaneously. The media guidance application may simultaneously generate for display the first stream and the second stream, allowing the user to, for example, access the video game in the video game platform while listening to the broadcast hosts in the first stream. Considering a potential delay between the first stream and the second stream (e.g., in order to present the second stream, the media guidance application requires extra time to monitor, parse, and re-render the video game engine data based on the first stream), the media guidance application may rely on a buffer for the first stream, to synchronize the video contents of the respective streams (e.g., visuals and audio). Accordingly, the media guidance application may access synchronization data such as timestamps to ensure synchronized playback of the first and second stream. For example, the media guidance application may compare a first timestamp associated with the curated viewing perspective and a second timestamp associated with the non-curated viewing perspective. In response to determining that the first timestamp and the second timestamp correspond to a same gameplay event (e.g., the tennis ball hitting the net of the racket), the media guidance application may generate for display the first stream and the second stream such that the first timestamp and the second timestamp are synchronized (e.g., playing in parallel).

To further elaborate, the media guidance application may synchronize playback of the first stream and the second stream by matching the first timestamp and second timestamp. In some embodiments, this synchronization process involves the media guidance application determining a time delay between the first timestamp and the second timestamp and delaying the first stream by the time delay such that the gameplay event associated with the first timestamp and the gameplay event associated with the second timestamp (e.g., the same gameplay event in the two streams) are played back concurrently. In some embodiments, the media guidance application may determine whether the time delay is greater than a delay threshold. The delay threshold represents a preset maximum lag time (e.g., 10 seconds) between the first stream and the second stream. The user may also adjust the delay threshold. In response to determining that the time delay is greater than the delay threshold, the media guidance application may attempt to reduce processing times associated with generating the second stream in order to reduce the time delay. This is especially crucial for replicating live gameplay streams shown in real-time. Accordingly, the media guidance application may store game elements such as game objects, game coordinates, game audio or non-gameplay content (e.g., overlaid video/audio of the players) associated with the curated viewing perspective in a cache memory. Thus, the media guidance application may quickly retrieve the game elements from the cache memory to generate the second stream.

In some embodiments, the media guidance application may identify an efficient manner to allocate memory in order to reduce processing times. For example, the media guidance application may store data in a solid-state drive and create caches for game objects that are often retrieved for generation in the video game platform. The media guidance application may determine an amount of times the set of game coordinates of the game object changes across fingerprints and/or an amount of times the game object appears in fingerprint(s) of the first stream. For example, the game coordinates for a tennis net may remain stationary in the game space. In contrast, the game coordinates of the tennis ball may change multiple times. The media guidance application may retrieve an occurrence threshold that represents a minimum number of times a game object appears or a minimum number of times the game coordinates of a game object changes. The media guidance application may determine whether the amount of times a game object appears in a fingerprint of the first stream is greater than the occurrence threshold. If the amount exceeds the occurrence threshold, the media guidance application may store the game object and the data associated with the game object in a cache memory. Similarly, if the amount of times the game coordinates of a game object changes across fingerprints of the first stream is greater than the occurrence threshold, the media guidance application may store the game object and the game coordinates in a cache memory. This ensures quick data retrieval of the game objects and game coordinates and reduces processing times.

The media guidance application may also selectively render game elements (e.g., audio, game objects, game refresh rate, etc.) to reduce processing times for generating the second stream or to reduce excessive bandwidth consumption. For example, the media guidance application may retrieve a threshold bandwidth from the user profile. Suppose the threshold bandwidth is 10 Mbps (e.g., the maximum bandwidth capabilities of the network or a user-set maximum). The media guidance application may determine that retrieving all video game engine data requires 7 Mbps and receiving the first stream requires 5 Mbps. In order to avoid exceeding the threshold bandwidth, the media guidance application may, for example, retrieve only video game engine data that is not associated with audio information. Similarly, the media guidance application may only receive the video component of the first stream.

In some embodiments, the media guidance application may determine alternative actions associated with gameplay displayed in the first stream. The media guidance application may refer to the video game engine data and determine the ideal action to perform in a specific in-game scenario. For example, the media guidance application may determine that in response to a tennis serve, the player should move the in-game tennis player along a certain vector and swing the racket at a specific point in time, to make an ideal return (e.g., a return that allows the player to earn a point). The media guidance application may compare the action of the player with the ideal action to identify issues. Suppose that the player moved the in-game tennis player along a different vector and failed to return the serve. The media guidance application may generate for display the ideal action and highlight the issues in the original action (e.g., taking too many steps wide to return a tennis serve, or waiting in the wrong position for too long, etc.). In addition, the media guidance application may display a metric of how well the game was played in the first stream, in comparison to the ideal actions.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are thus described for creating a non-curated viewing perspective in a video game platform based on a curated viewing perspective. The non-curated viewing perspective may be associated with the user-selected camera angle and in-game position; the curated viewing perspective may be associated with the camera angle and in-game position of the original video the user is viewing. For example, the user may be viewing a gameplay video of the video game "Tennis World Tour 2018," on a streaming website such as YouTube. The user may be interested in viewing the same gameplay from a perspective in the video game that is different from the perspective of the YouTube video. Accordingly, a media guidance application may identify the video game in the YouTube video and retrieve video game engine data associated with the game. Suppose the video game can be played on a video game console such as the PlayStation 4. In response to determining that the user has access to a PlayStation 4, the media guidance application may replicate the gameplay depicted in the YouTube video on the PlayStation 4 using the video game engine data. The user may be able to change the perspective (e.g., in-game position of the camera and the camera angle) within the replicated video game platform, via user commands. In response to receiving a user command to change the curated viewing perspective to a non-curated viewing perspective, the media guidance application may re-render the gameplay from the non-curated viewing perspective.

Figure 1:
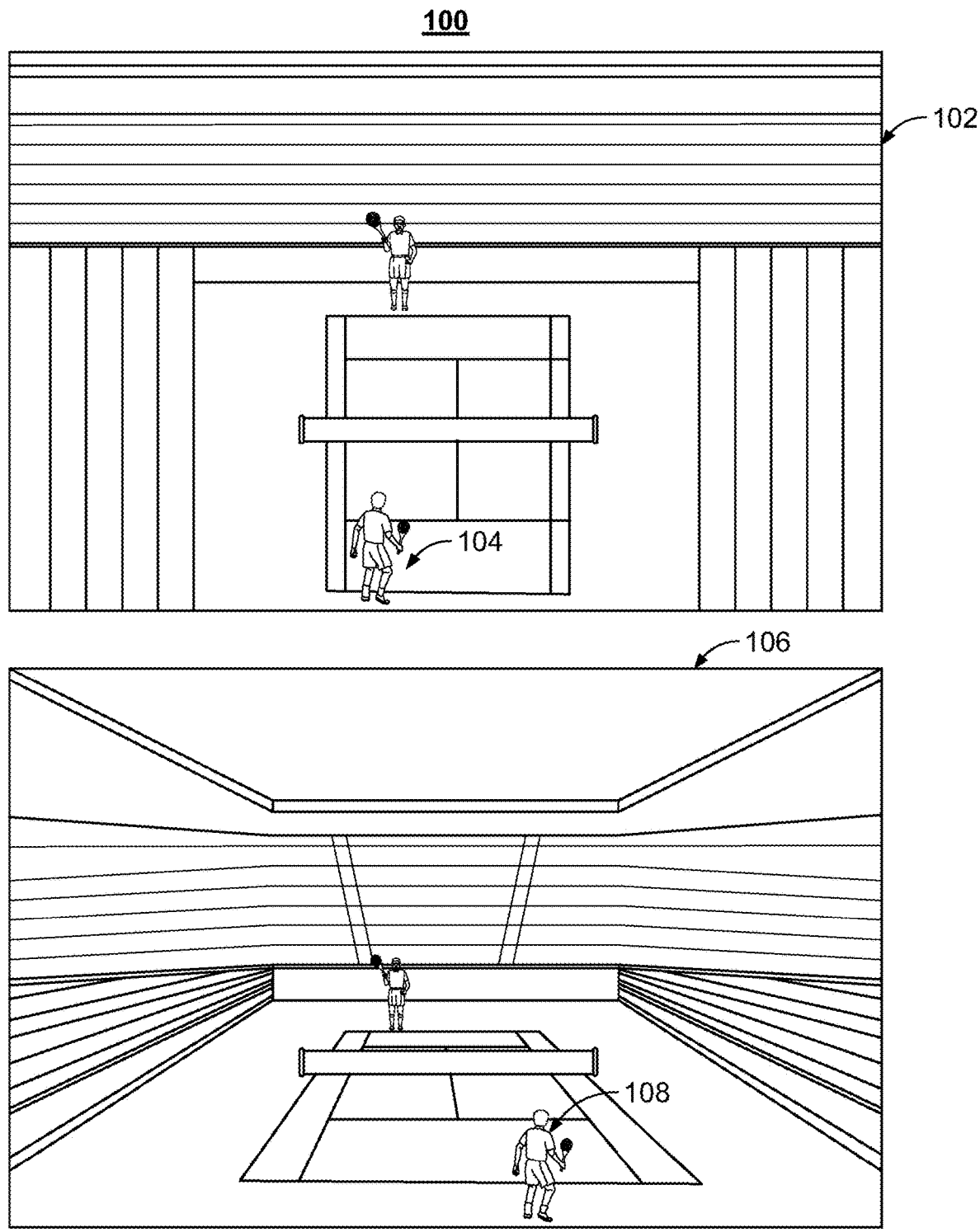
FIG. 1 shows illustrative examples of a first stream and the respective virtual game space, in accordance with some embodiments of the disclosure.

FIG. 1 shows illustrative examples of a first stream and the respective virtual game space, in accordance with some embodiments of the disclosure. Stream 102 represents stream 102 that the user accesses. Stream 102 may be a video sent to the user, a video uploaded to a streaming website such as YouTube (e.g., "let's play format"), or an in-game tutorial. Suppose the user is viewing a live stream gameplay video of a tennis simulation game (e.g., Tennis World Tour 2018) via a streaming website such as YouTube. Stream 102 may depict the video game environment as rendered by a video game console (e.g., a PlayStation 4). The rendered content that makes up the video game environment may include game objects such as player models, the tennis stadium, the court, the tennis net, the ball, etc. The video game environment may include visible game mechanics (e.g., the movement of the characters and the ball) and audio information. The curated viewing perspective may comprise a camera angle and an in-game viewing position. For example, traditionally in tennis simulation games, the in-game viewing position is an elevated position behind a first tennis player, as displayed in stream 102. The in-game viewing position allows the camera angle (e.g., a viewing field directed in a particular direction) to capture the entire court and the second tennis player on the opposite side.

The media guidance application may receive video game engine data simultaneously with stream 102. The video game engine data refers to all information that is needed to render the content of the video game. This information may include code, datasets, graphics, audio, etc. In addition, the video game engine data may include information about the game such as the title, genre, creator names, developer names, game format, release date, etc. In some embodiments, the video game engine data may include the input video game commands that were executed to create the video game gameplay depicted in stream 102. For example, alongside the live stream gameplay video on YouTube, the user may simultaneously receive at user equipment, a downloadable metadata file comprising of video game engine data which includes real-time executed commands. These commands may include moving the virtual tennis player around the court and hitting the ball.

The media guidance application may determine a video game associated with the video game environment and the video game engine data. For example, the media guidance application may determine from the video game engine data, that the name of the video game associated with the video game environment is "Tennis World Tour 2018."

Furthermore, the media guidance application may determine the video game platform that supports the video game engine data associated with the video game. The video game platform may be an actual video game console (e.g., PlayStation 4, Xbox One, PC, etc.) or an emulator that can imitate the functionality of a video game console. Based on the video game engine data or the metadata of stream 102, both of which may include information about the video game console used in gameplay, the media guidance application may identify a compatible emulator or video game console as the video game platform. The media guidance application utilizes the video game platform and the video game engine data to recreate the video game in stream 102.

The media guidance application may then determine whether the video game and the video game platform are accessible to the user equipment. For example, the media guidance application may refer to the user profile to determine whether the user has access to the video game console and/or the video game. Suppose that the live stream the user is watching features the game "Tennis World Tour 2018," as played on the PlayStation 4. Based on the user profile, the media guidance application may determine that the user equipment has access to both the PlayStation 4 and "Tennis World Tour 2018."

The media guidance application may then process the video game engine data to generate a second stream comprising a replication of the video contents that is viewable within a video game platform. The media guidance application may use the video game engine data to identify the game objects rendered in the video game environment, as depicted in stream 102. For example, the video game engine data may provide a predetermined list of game objects, graphics, positions, mechanics and audio associated with each frame of stream 102. If the video game engine data does not provide this information for each frame of stream 102, the media guidance application may utilize objection recognition to identify objects in stream 102 and compare them to the video game engine data.

For example, in some embodiments, the media guidance application may capture a fingerprint of the video contents of stream 102. The fingerprint of the video contents may be an image capture of a set of frames of the video contents. The fingerprint may include an audio clip associated with the set of frames. The fingerprint may also take include input video game commands associated with the gameplay in the set of frames. As discussed previously, these input video game commands may be retrieved from the video game engine data. The media guidance application may then determine a set of characteristics associated with the fingerprint. For example, the media guidance application may use object recognition to identify objects in the set of frames. These objects may include the tennis players, the court, the net, the tennis ball, etc. The media guidance application may also perform sound recognition to isolate various sounds in the audio clip. For example, the sounds may be of the tennis ball being hit, the crowd, the players, the commentators, etc.

In some embodiments, the media guidance application may perform object recognition on a frame of stream 102 to identify a dimensional space. The media guidance application may determine whether stream 102 is depicting a three-dimensional space (e.g., a tennis court) or a two-dimensional space (e.g., a side scrolling environment such as in Super Mario World). In order to identify the dimensional space, the media guidance application may utilize a combination of computer vision and machine learning. More specifically, the media guidance application may use the frame of stream 102 as an input to a machine learning algorithm that outputs a depth map. The machine learning algorithm may be pre-trained using a variety of images and dimensional data associated with the images. An algorithm trained to identify how objects in an image appear, based on the dimensions of the space depicted in the image, may output the identity of the dimensional space. For example, the algorithm, as implemented by the media guidance application, may detect features such as the position of various objects in the frame and determine a depth map accordingly. If the depth map is described in three dimensions (e.g., via an x-coordinate, a y-coordinate and a z-coordinate), the media guidance application may determine that the dimensional space is three-dimensional. If the depth map is described in two dimensions (e.g., via an x-coordinate and a y-coordinate), the media guidance application may determine that the dimensional space is two-dimensional.

The media guidance application may then perform object recognition on the frame of stream 102 to identify the object of the plurality of objects. For example, the media guidance application may utilize image processes such as segmentation to identify pixels in the frame that can be grouped to form an object. In response to segmenting the frame, the media guidance application may compare the segmented pixels to images in an image database stored in memory or in a remote server. The image database may contain images of various objects and identify them with names. For example, the media guidance application may segment a group of pixels in the frame of stream 102 that form a tennis ball. The media guidance application may compare those segmented pixels to the images in the image database and determine a correspondence with an image of a tennis player (e.g., object 104). In response to determining the match, the media guidance application may classify the segmented pixels based on the name of the image that matched the segmented pixels.

The media guidance application may determine the location of the object of the plurality of objects with respect to a virtual viewing position in the dimensional space. For example, the media guidance application may utilize the depth map discussed previously to determine the positions of the objects relative to each other. For example, the depth map may indicate that the first tennis player (e.g., object 104) is at an arbitrary position (1, 2, 1) and the second tennis player is at (−5, 2, 5). These values indicate that the second tennis player is 6 units to the left and 4 units ahead of the first tennis player. As mentioned previously, these units may be arbitrary (e.g., virtual inches, meters, pixels, etc.). The y-coordinate signifies that both tennis players are at the same elevation.

In some embodiments, the media guidance application may determine whether a set of characteristics, wherein the set of characteristics comprises a dimensional space, an object of a plurality of objects, and a location of the object of the plurality objects, associated with the fingerprint corresponds with a set of game elements in the video game engine data.

For example, in some embodiments, the media guidance application may search the video game engine data for a virtual game space that matches the dimensional space. For example, in response to determining that stream 102 is associated with a three-dimensional space, the media guidance application may search the video game engine data for code that describes three-dimensional objects and environments. In response to determining that the video game engine data is associated with three-dimensional objects and rendering, the media guidance application may determine that the virtual game space of the video game is expressed in three dimensions. The virtual game space is represented as space 106 in FIG. 1.

The media guidance application may then search the video game engine data for a game object that matches the object of the plurality of objects. For example, the media guidance application may label object 104 with an identifier such as "tennis player one." In some embodiments, the media guidance application may associate additional details with tennis player one. For example, the media guidance application may recognize that tennis player one is Roger Federer and is wearing a blue shirt with black shorts. The game elements in the video game engine data may be graphics, audio, game code, etc. The media guidance application may determine whether there are any game elements associated with Roger Federer in the video game engine data. For example, the media guidance application may identify code in the video game engine data that can render Roger Federer in the virtual game space. The code may also reference the black shirt and black shorts attire, audio clips of Roger Federer, game mechanics that are associated with his movement, etc., which are also found in the video game engine data. Accordingly, the media guidance application may determine that object 104 "tennis player one" is associated with a specific game element (e.g., game code) that can be used to render an in-game version of the object, represented as game object 108.

In response to identifying the virtual game space (e.g., space 106) and the game object (e.g., game object 108) in the video game engine data, the media guidance application may determine a set of game coordinates of the game object in the virtual game space based on the location/position of the object of the plurality of objects. As discussed previously, the positions of the objects in the plurality of objects are relative to any arbitrary object (e.g., tennis player one) identified in stream 102. In order to determine game coordinates, the media guidance application may first retrieve the virtual viewing position from the video game engine data. For example, video game engine data may indicate a default virtual viewing position that the game initializes the video game environment around. In addition, the media guidance application may determine the default position of a game object such as tennis player one. The media guidance application may determine the displacement between the game object and the virtual viewing position. Suppose that the virtual viewing position is at an origin (0, 0, 0) and the game object is at the coordinate (0, −15, 20). This signifies that when the video game is normally rendered, tennis player one is always 15 units below and 20 units ahead of the virtual viewing position. Using the locations/positions of the plurality of objects relative to the object "tennis player one" in stream 102, the media guidance application may calculate the game coordinates of the game objects relative to the game object, tennis player one. For example, if the virtual displacement between tennis player one and tennis player two is (−1, 0, 40) in stream 102, the media guidance application may determine that the displacement between the respective game objects is proportional to (−1, 0, 40) in the virtual game space.

The media guidance application may then determine a video refresh rate of stream 102. For example, the media guidance application may refer to the metadata of stream 102 to determine the amount of frames per second transmitted in stream 102. The media guidance application may determine a game refresh rate based on the video refresh rate. For example, the media guidance application may retrieve a refresh rate in the video game engine data. This refresh rate may indicate the amount of frames in a period of time that can be presented to a user accessing the video game (e.g. 60 Hz). The video refresh rate may be different from this refresh rate because of streaming conditions associated with receiving stream 102 (e.g., 50 Hz). The media guidance application may thus determine a game refresh rate whose value is equal to one of the refresh rates or is between the two refresh rates (e.g., 45 Hz).

Accordingly, the media guidance application may render at the game refresh rate, within the video game platform, the game object at the set of game coordinates in the virtual game space. For example, the media guidance application may execute the game code provided in the video game engine data to render the game objects at their respective game coordinates. Furthermore, the media guidance application may monitor stream 102 and re-render the game objects based on the game refresh rate. Thus, if the game refresh rate transmits 45 frames per second, the media guidance application may monitor for changes in stream 102 for each frame and re-render accordingly.

The media guidance application may thus generate for display the video contents within the video game platform at the virtual viewing position and at a virtual viewing angle that matches the curated viewing perspective. The virtual viewing angle may be a vector that points in a specific direction in the virtual game space. For example, from the virtual viewing position (0, 0, 0), the vector may point to the coordinate (0, −15, 30) (e.g., the center of the virtual tennis net). Therefore, the virtual viewing angle focus the curated viewing perspective to the court. If the virtual viewing angle is associated with a vector pointing to the game coordinate (0, −15, −30), the curated viewing perspective may be focused in the opposite direction (e.g., towards the virtual audience in the stands behind the court).

The media guidance application may generate for display the video contents within the video game platform using the curated viewing perspective. The video contents of the second stream, unlike stream 102, are based in the video game platform. Therefore, the second stream is not simply a video and the user can interact with the second stream through user commands.

Figure 2:
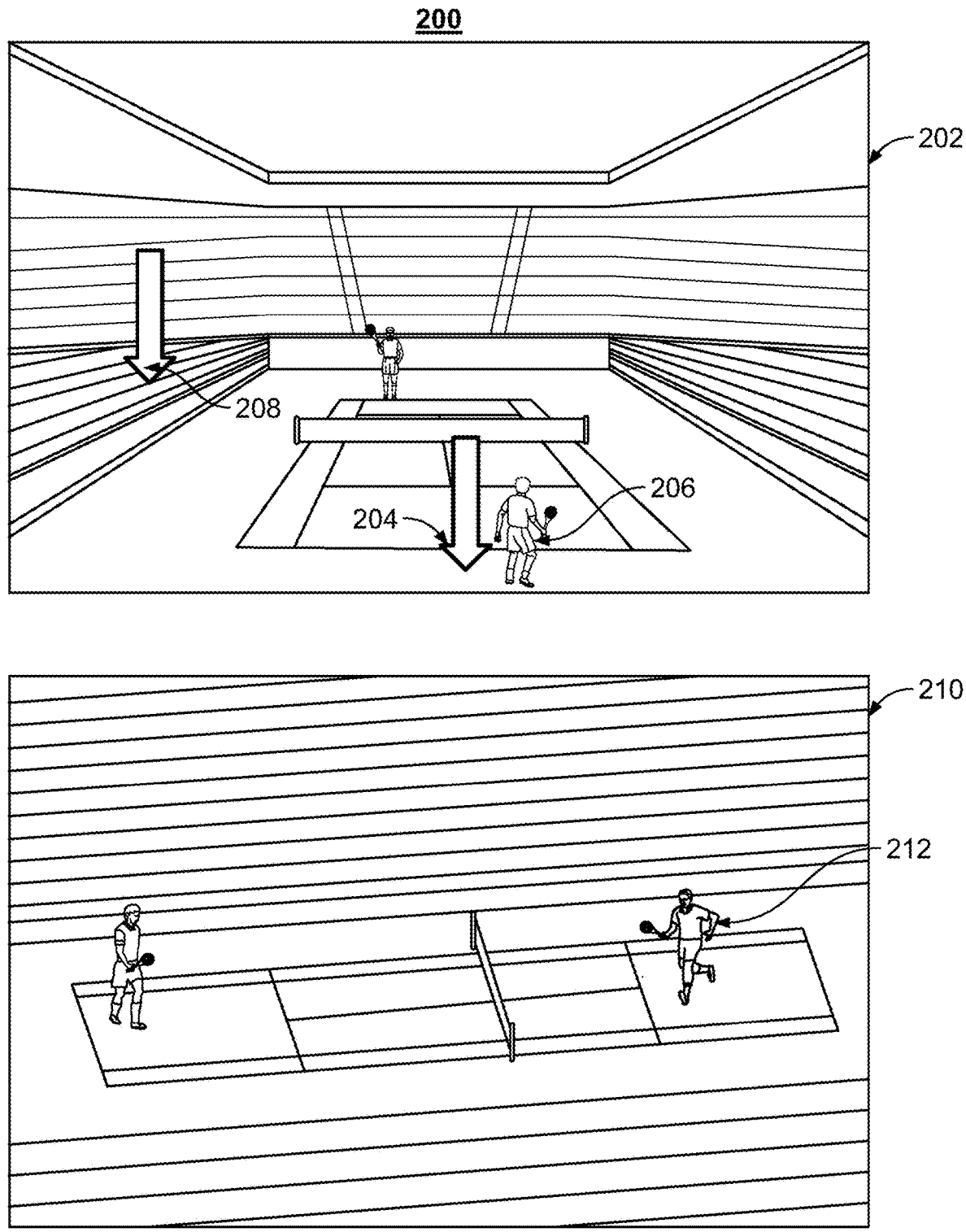
FIG. 2 shows an illustrative example of selecting a non-curated viewing perspective in the virtual game space, in accordance with some embodiments of the disclosure.

FIG. 2 shows an illustrative example of selecting a non-curated viewing perspective in the virtual game space, in accordance with some embodiments of the disclosure. Space 202 is the same space as space 106 in this example. Likewise, game object 206 represents the tennis player represented as game object 108. The media guidance application may receive input, at the user equipment, requesting to view the video contents from a non-curated viewing perspective. For example, in some embodiments, the media guidance application may receive a user-selected virtual viewing position in the video game platform of the second stream. The media guidance application may generate virtual cursor 204 that points to a game coordinate in the virtual game space. The user may move the virtual cursor to any arbitrary position in the virtual game space. For example, given that Tennis World Tour 2018 is a three-dimensional game, the media guidance application may receive a user-selected virtual viewing position when the user shifts virtual cursor 204 to the coordinates (4, 5, 2), as represented by virtual cursor 208. These coordinates may be in arbitrary units (e.g., meters, inches, pixels, etc.).

The media guidance application may then determine a virtual displacement between the user-selected virtual viewing position and the curated virtual viewing position. For example, if the user-selected virtual viewing position is (4, 5, 2) (e.g., highlighted by virtual cursor 208) and the curated virtual viewing position is (0, 0, 0) (e.g., highlighted by virtual cursor 204), then the virtual displacement between the two points is (4, 5, 2) (e.g., the difference between each respective coordinate of the two positions). It should be noted that the displacement is associated with a vector that points to the user-selected virtual viewing position.

In some embodiments, the media guidance application may shift each game coordinate of the set of game coordinates by the virtual displacement. For example, the position of tennis player one (e.g., game object 206) is originally (10, −15, 20) with respect to the curated virtual viewing position. Upon shifting the position by the virtual displacement, the new position becomes (6, −20, 18). The position of the user thus remains stationary. However, all game objects and their respective positions are shifted by the virtual displacement.

In some embodiments, the media guidance application may shift a virtual viewing position of the user by the virtual displacement to the user-selected virtual viewing position. For example, the position of the user is originally (0, 0, 0) based on the curated virtual viewing position. Upon shifting the virtual viewing position by the virtual displacement, the new position becomes (4, 5, 2). The position of the game objects thus remains stationary.

The media guidance application may thus generate for display, using the video game engine data, the viewing contents from the non-curated viewing perspective. For example, the media guidance application may change the virtual position of the user and the camera angle based on the requested non-curated viewing perspective. Using the video game engine data, the media guidance application may re-render all game objects, audio, graphics and virtual environments associated with stream 102 at a new set of positions with respect to the user's new virtual position. This allows the user to view the gameplay from a different perspective (e.g., the non-curated perspective). The viewing contents are displayed in stream 210. Object 212 represents the same tennis player as game object 206. However, as can be seen, the viewing position and the viewing angle have been changed based on the user's selection as indicated by virtual cursor 208.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
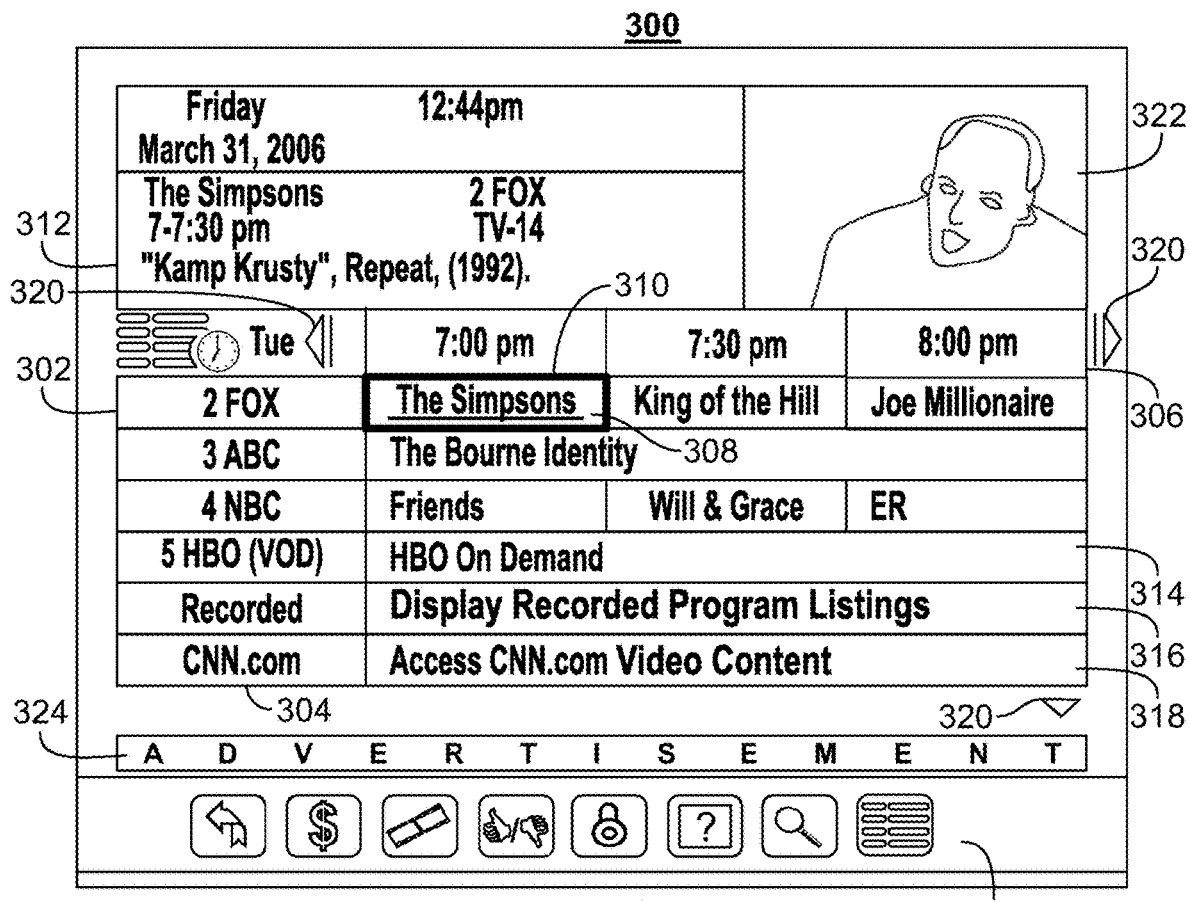
FIGS. 3 and 4 show illustrative examples of display screens generated by a media guidance application in accordance with some embodiments of the disclosure.
Figure 4:
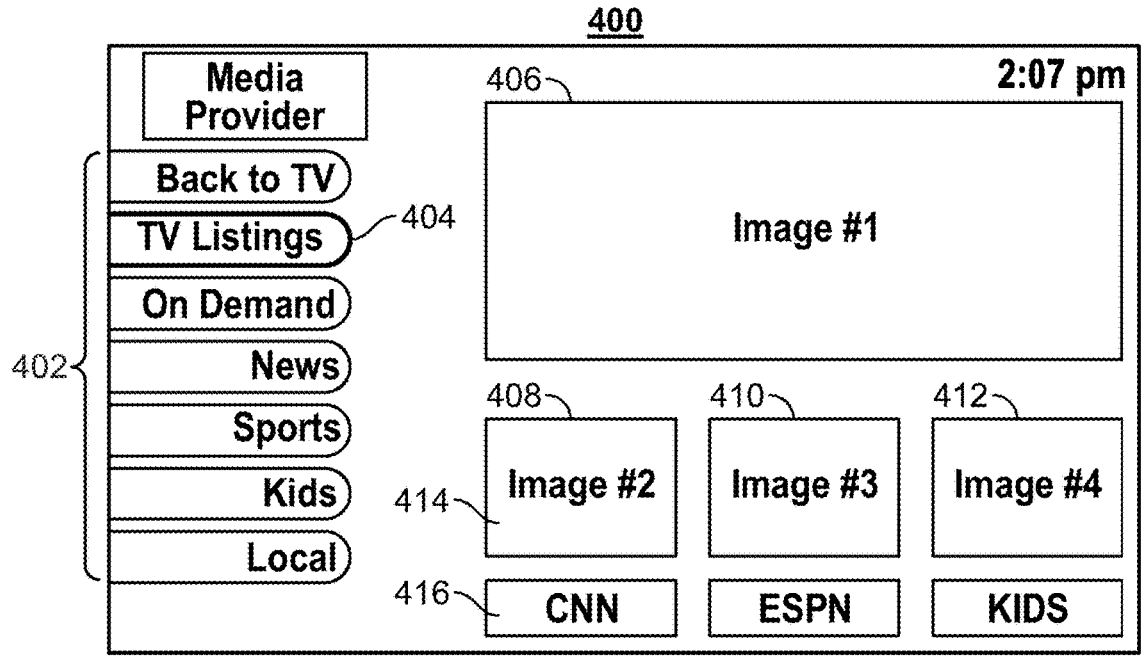

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
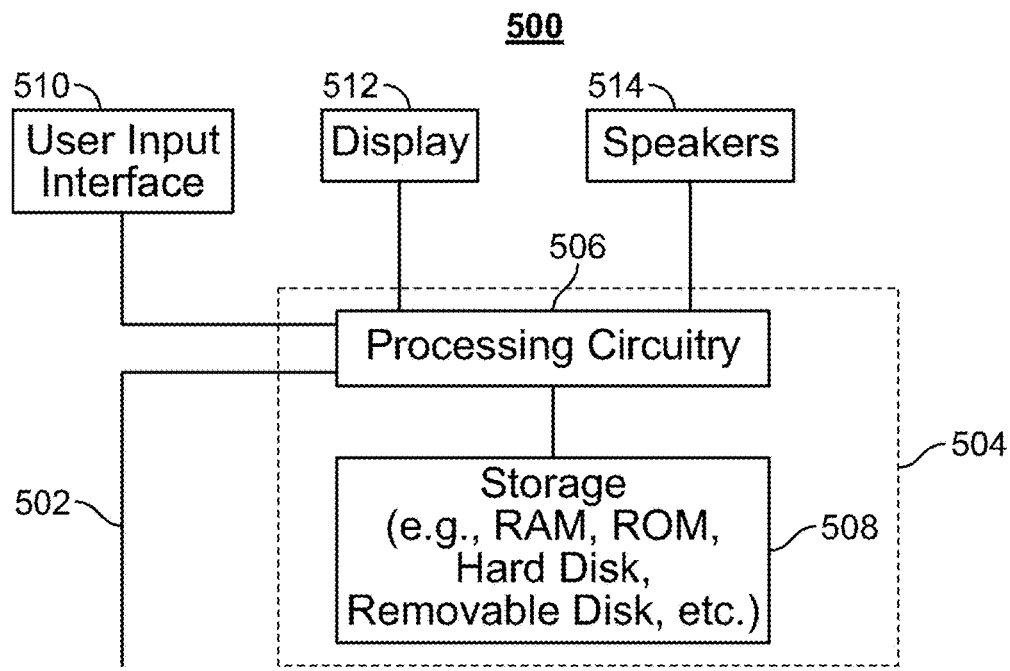
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
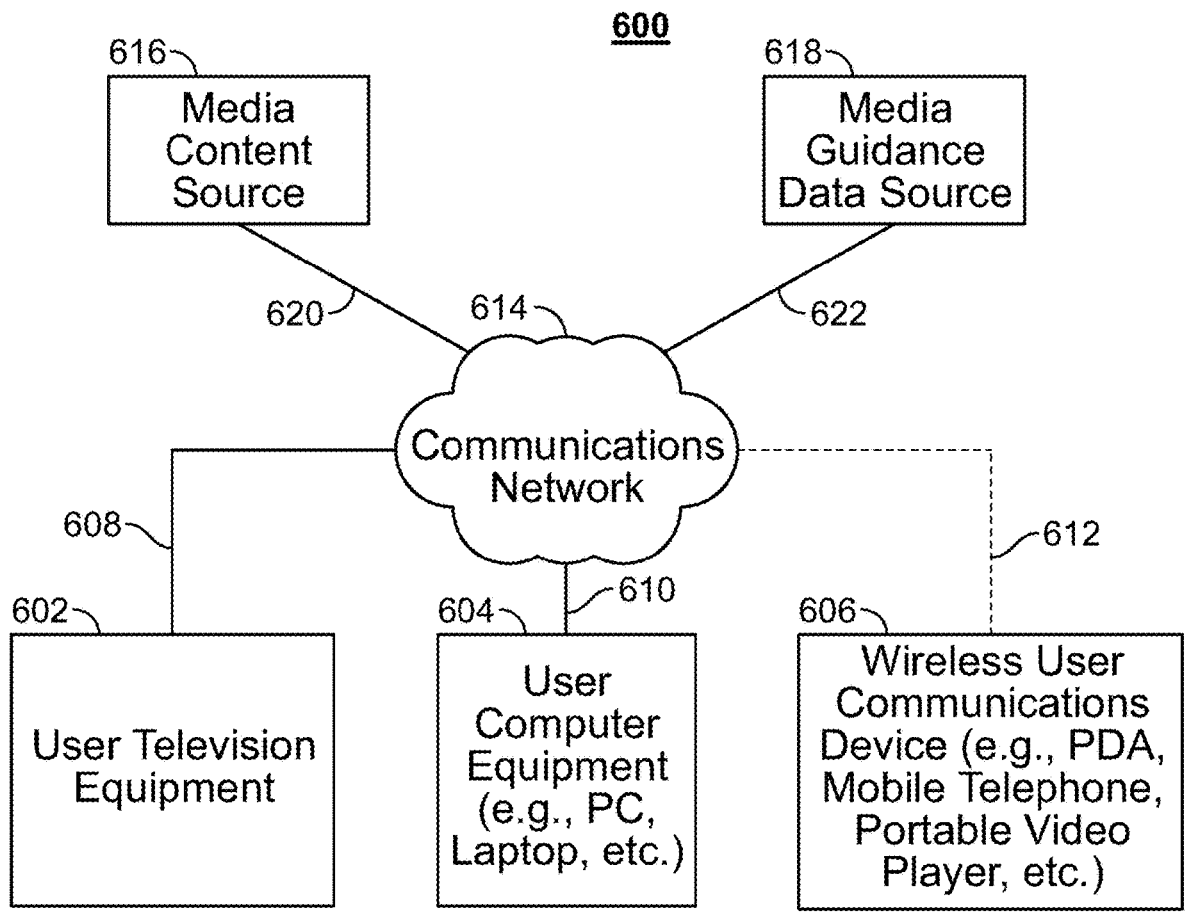
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
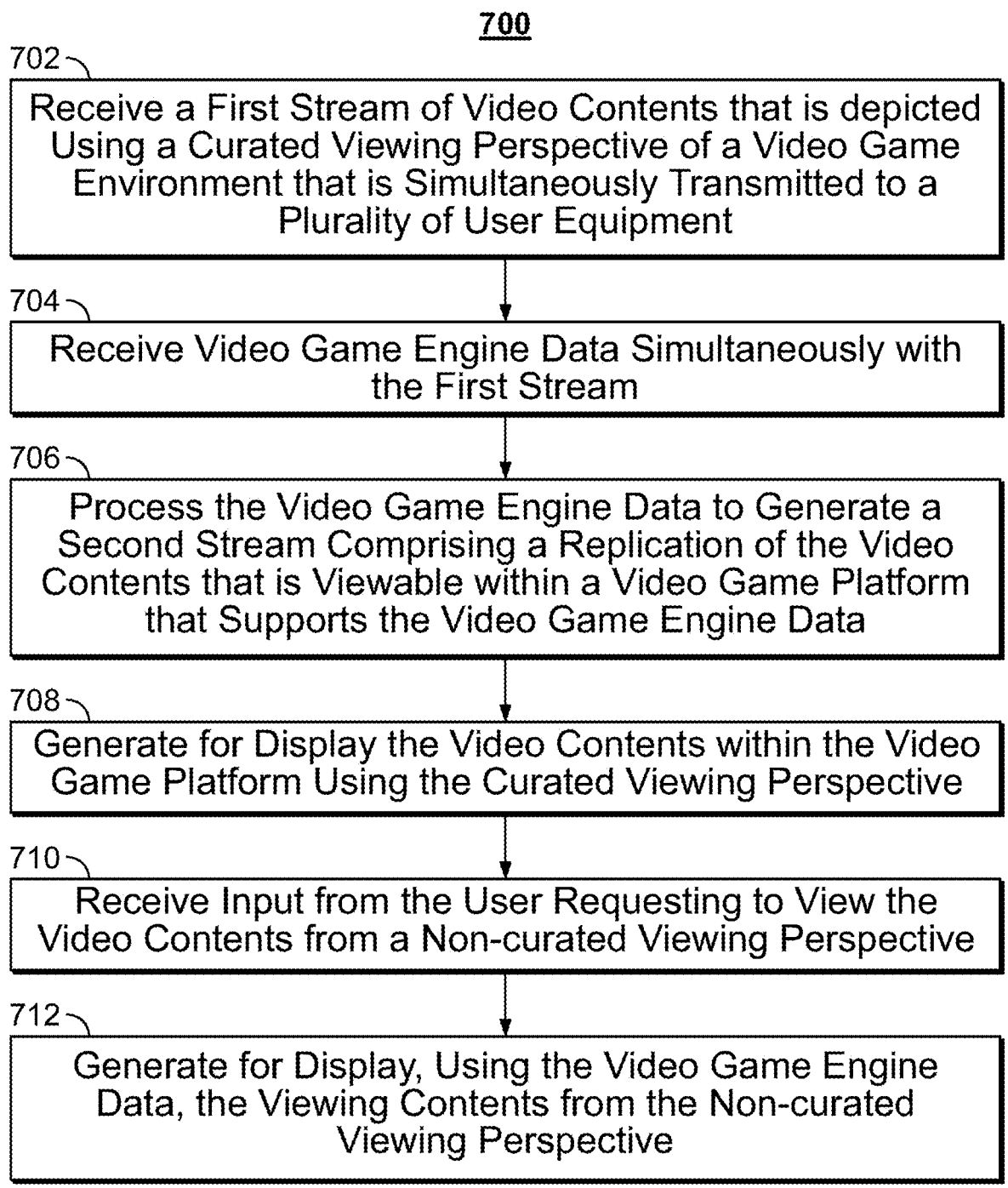
FIG. 7 is a flowchart of an illustrative process for creating a non-curated viewing perspective in a video game platform based on a curated viewing perspective, in accordance with some embodiments of the disclosure.

FIG. 7 is a flowchart of an illustrative process for creating a non-curated viewing perspective in a video game platform based on a curated viewing perspective, in accordance with some embodiments of the disclosure. It should be noted that process 700 or any step thereof could be performed on, or provided by, any of the devices shown in FIGS. 5-6. For example, process 700 may be executed by control circuitry 504 (FIG. 5) as instructed by a media guidance application implemented on a user device (e.g., user equipment devices 602, 604, and/or 606 (FIG. 6)) in order to create a non-curated viewing perspective in a video game platform based on a curated viewing perspective. In addition, one or more steps of process 700 may be incorporated into or combined with one or more steps of any other process or embodiment (e.g., as described in relation to FIGS. 1-2 and 8-16).

At step 702, control circuitry 504 (FIG. 5) receives (e.g., via I/O Path 502 (FIG. 5)) a first stream of video contents that is depicted using a curated viewing perspective of a video game environment that is simultaneously transmitted to a plurality of user equipment. For example, the first stream of video contents may be of a video game tournament and may showcase the gameplay of two or more competitors. Suppose the video game tournament being broadcasted is related to sports video games; specifically, two competitors may be facing each other in a video game tennis match. The video game environment is created by fully rendering a video game on a video game console (e.g., PlayStation 4, Xbox One, PC, etc.). In particular, the video game environment refers to the rendered content of the video game (e.g., game objects, scenes, character models, game mechanics, etc.). The curated viewing perspective may comprise a camera angle and an in-game viewing position that one of the competitors is viewing the video game from, such that the perspective of the competitor is the same as the curated viewing perspective. The curated viewing perspective is locked to the first stream's camera cuts. Therefore, if the first stream depicts the gameplay from the perspective of the first competitor at a time t1 and then cuts to the gameplay from the perspective of a second competitor at a time t2, the curated viewing perspective too changes to the perspective of the second competitor (e.g., to display what the second competitor sees on his/her screen while playing the video game).

At step 704, control circuitry 504 (FIG. 5) receives (e.g., via I/O Path 502 (FIG. 5)) video game engine data simultaneously with the first stream. The video game engine data refers to all information that is needed to render the content of the video game. This information may include code, datasets, graphics, audio, etc. In some embodiments, the video game engine data may include the input video game commands made by the competitors. For example, suppose the competitor began playing the video game at time t1. At time t2, the competitor may have entered a command (e.g., pressed a button on a controller, made a gesture, gave a verbal cue, etc.) into the video game console in order to swing a racket held by a virtual tennis player in a video game. Accordingly, the video game engine data received by control circuitry 504 may include the command information such as the game object the user was controlling, the command given, and a timestamp of when the command was given.

At step 706, control circuitry 504 (FIG. 5) processes the video game engine data to generate a second stream comprising a replication of the video contents that is viewable within a video game platform that supports the video game engine data. The video game platform refers to a virtual sandbox that control circuitry 504 populates using the video game engine data to recreate the video game shown in the first stream. The video game platform may be an actual video game console (e.g., PlayStation 4, Xbox One, PC, etc.) or an emulator that can imitate the functionality of a video game console. Control circuitry 504 may use the video game engine data to identify the game objects rendered in the video game the competitors are playing, and the commands the competitors are entering during gameplay. Using this video game engine data, control circuitry 504 may generate the video game in the video game platform and execute the commands entered by the competitors in real-time, thus creating a second stream that replicates the video contents of the first stream.

At step 708, control circuitry 504 (FIG. 5) generates for display the video contents within the video game platform using the curated viewing perspective. The video contents of the second stream, unlike the first stream, are based in the video game platform. Therefore, the second stream is not simply a video and the user can interact with the second stream via I/O Path 502 (FIG. 5) through user commands.

At step 710, control circuitry 504 (FIG. 5) receives input from the user (e.g., via I/O Path 502) requesting to view the video contents from a non-curated viewing perspective. For example, the user may move a virtual cursor in the second stream to an arbitrary spot of the virtual environment depicted in the second stream (e.g., on the virtual tennis court) and select a viewing position. The viewing position alongside the camera angle associated with the viewing position represent the non-curated viewing perspective.

At step 712, control circuitry 504 (FIG. 5) generates for display, using the video game engine data, the viewing contents from the non-curated viewing perspective. For example, control circuitry 504 may change the virtual position of the user and the camera angle according to the requested non-curated viewing perspective. Using the video game engine data, control circuitry 504 may re-render all game objects, audio, graphics and virtual environments associated with the first stream with respect to the user's new virtual position. This allows the user to view the gameplay of the competitor from a different perspective (e.g., the non-curated perspective).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 7.

Figure 8:
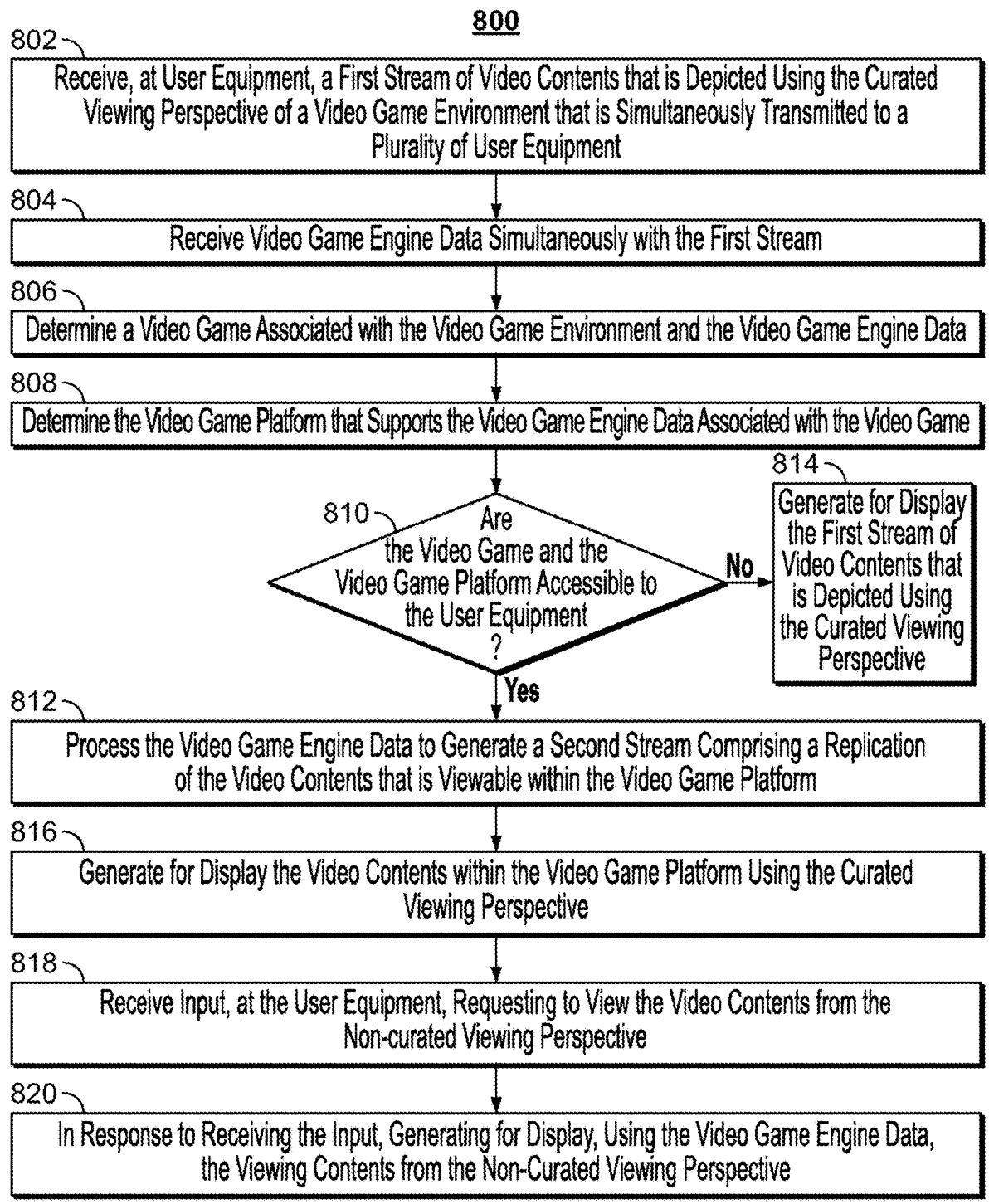
FIG. 8 is a flowchart of a detailed illustrative process for creating a non-curated viewing perspective in a video game platform based on a curated viewing perspective, in accordance with some embodiments of the disclosure.

FIG. 8 is a flowchart of a detailed illustrative process for creating a non-curated viewing perspective in a video game platform based on a curated viewing perspective, in accordance with some embodiments of the disclosure. It should be noted that process 800 or any step thereof could be performed on, or provided by, any of the devices shown in FIGS. 5-6. For example, process 800 may be executed by control circuitry 504 (FIG. 5) as instructed by a media guidance application implemented on a user device (e.g., user equipment devices 602, 604, and/or 606 (FIG. 6)) in order to create a non-curated viewing perspective in a video game platform based on a curated viewing perspective. In addition, one or more steps of process 800 may be incorporated into or combined with one or more steps of any other process or embodiment (e.g., as described in relation to FIGS. 1-2, 7 and 9-16).

At step 802, control circuitry 504 (FIG. 5) receives, at user equipment (e.g., via I/O Path 502 (FIG. 5)), a first stream of video contents that is depicted using a curated viewing perspective of a video game environment that is simultaneously transmitted to a plurality of user equipment. The source of the first stream may be the media content source 616 (FIG. 6). The first stream of video contents may be any video that is depicting video game gameplay. For example, the first stream may be a video sent to the user, a video uploaded to a streaming website such as YouTube (e.g., "let's play format"), or an in-game tutorial. Suppose the user is viewing a live stream video of gameplay of a tennis simulation game such as "Tennis World Tour 2018" on a streaming website such as YouTube. The first stream may depict the video game environment as rendered by a video game console such as the PlayStation 4. The rendered content that makes up the video game environment may include game objects such as player models, the tennis stadium, the court, the net, the ball, etc. The video game environment may include visible game mechanics (e.g., the movement of the characters and the ball). The curated viewing perspective may comprise a camera angle and an in-game viewing position. Traditionally in tennis simulation games, the in-game position is an elevated position behind a first tennis player that allows the camera angle to capture the entire court and the second tennis player on the opposite side.

At step 804, control circuitry 504 (FIG. 5) receives (e.g., via I/O Path 502 (FIG. 5)) video game engine data simultaneously with the first stream (e.g., from the media guidance data source 618 (FIG. 6)). The video game engine data refers to all information that is needed to render the content of the video game. This information may include code, datasets, graphics, audio, etc. In addition, the video game engine data may include information about the game such as the title, genre, creator names, developer names, game format, release date, etc. In some embodiments, the video game engine data may include the input video game commands that were executed to create the video game gameplay depicted in the first stream. For example, alongside the live stream video of gameplay on YouTube, the user may simultaneously receive at user equipment, a downloadable metadata file comprising of video game engine data which includes real-time executed commands (e.g., in order to have a virtual tennis player move around the court and hit the ball). In some embodiments, the video game engine data may be stored in storage 508 (FIG. 5).

At step 806, control circuitry 504 (FIG. 5) determines a video game associated with the video game environment and the video game engine data. For example, control circuitry 504 may determine from the video game engine data, that the name of the video game associated with the video game environment is "Tennis World Tour 2018." In the case that the video game engine data does not include the name of the video game, control circuitry 504 may screen capture a frame of the first stream depicting the video game environment and may apply imaging processes (e.g., coefficient of correlation calculation, and keypoint comparisons) to compare with gameplay images on the Internet or in a video game image database stored in storage 508 (FIG. 8). In response to determining a match (e.g., using correlation techniques) to an image on the Internet or in the video game image database, control circuitry 504 may determine the name of the video game the matched image is associated with. For example, the video game image database may store several images of gameplay for a plurality of video games and group each image based on the name of the video game.

At step 808, control circuitry 504 (FIG. 5) determines the video game platform that supports the video game engine data associated with the video game. The video game platform refers to a virtual sandbox that control circuitry 504 populates using the video game engine data to recreate the video game shown in the first stream. The video game platform may be an actual video game console (e.g., PlayStation 4, Xbox One, PC, etc.) or an emulator that can imitate the functionality of a video game console. The emulator may be stored in storage 508 (FIG. 5). Based on the video game engine data or the metadata of the first stream, both of which may include information about the video game console used in gameplay, control circuitry 504 may identify a compatible emulator or video game console as the video game platform.

At step 810, control circuitry 504 (FIG. 5) determines whether the video game and the video game platform are accessible to the user equipment. For example, control circuitry 504 may refer to the user profile in storage 508 (FIG. 5) to determine whether the user has access to the video game console and/or the video game. Suppose that the live stream the user is watching features the game "Tennis World Tour 2018" as played on the PlayStation 4. Based on the user profile, control circuitry 504 may determine that the user equipment has access to both the PlayStation 4 and "Tennis World Tour 2018." In response, the process proceeds to step 812. In some cases, the video game engine data may be compatible with multiple video game consoles. For example, a game such as "Tennis World Tour 2018" is compatible with the PlayStation 4 and the Xbox One. Even if the user does not have access to the PlayStation 4, control circuitry 504 may determine that the user equipment has access to the Xbox One and an alternate version of "Tennis World Tour 2018" compatible with the Xbox One. In response, the process proceeds to step 812. In some embodiments, control circuitry 504 may determine that the user equipment has access to an emulator on a video game platform (e.g., a personal computer). The emulator may be able to emulate the functionality of the PlayStation 4. In addition, control circuitry 504 may determine that the user equipment has access to an alternate version of "Tennis World Tour 2018" that is compatible with the emulator. In response, the process may proceed to step 812.

In response to determining that the video game and the video game platform are not accessible to the user equipment, the process proceeds to step 814 where control circuitry 504 generates for display the first stream of video contents that is depicted using the curated viewing perspective. In this embodiment, control circuitry 504 may determine that the user equipment does not have resources (e.g., the video game and/or the video game platform) to replicate, in the video game platform, the video contents of the first stream. In some embodiments, control circuitry 504 may generate for display an option to purchase or rent a version of the video game and/or the video game platform. In some embodiments, control circuitry 504 may refer to the user profile in storage 508 (FIG. 5) to identify a friend associated with the user who has access to the video game and/or the video game platform (e.g., via social media). In response, control circuitry 504 may generate for display an option for the user to request to borrow the video game and/or the video game platform from the user's friend. If the user accepts the option, control circuitry 504 may send a request for the video game and/or the video game platform to the user's friend. If the user's friend accepts, control circuitry 504 may retrieve the video game and/or an emulator associated with the video game platform. The process then proceeds to step 812.

At step 812, control circuitry 504 (FIG. 5) processes the video game engine data to generate a second stream comprising a replication of the video contents that is viewable within a video game platform. Control circuitry 504 may use the video game engine data to identify the game objects rendered in the video game environment, as depicted in the first stream. For example, the video game engine data may provide a predetermined list of game objects, graphics, positions, mechanics and audio associated with each frame of the first stream. If the video game engine data does not provide this information for each frame of the first stream, control circuitry 504 may utilize objection recognition to identify objects in the first stream and compare them to the video game engine data. For example, control circuitry 504 may identify a tennis ball in a frame of the first stream. In response, control circuitry 504 may search for the term "tennis ball" in the video game engine data to determine the code, graphics and mechanics associated with a game object "tennis ball." Control circuitry 504 may then utilize this information to render the game object "tennis ball" in the video game platform. This process is discussed in-depth in FIGS. 13-14. Control circuitry 504 may repeat this process until for all identified objects from the first stream.

At step 816, control circuitry 504 (FIG. 5) generates for display (e.g., on display 512 (FIG. 5) the video contents within the video game platform using the curated viewing perspective. The video contents of the second stream, unlike the first stream, are based in the video game platform. Therefore, the second stream is not simply a video and the user can interact with the second stream via I/O Path 502 (FIG. 5) through user commands.

At step 818, control circuitry 504 (FIG. 5) receives input at the user equipment (e.g., via I/O Path 502) requesting to view the video contents from a non-curated viewing perspective. Control circuitry 504 may generate for display a cursor that allows the user to interact with the virtual environment in the video game platform. For example, the cursor may be movable within the virtual boundaries as dictated by the video game engine data. As discussed previously, suppose that the curated viewing perspective is associated with an in-game position at an elevated spot behind a first tennis player. The in-game position may be high enough to allow the camera angle to capture the entire court and the second tennis player on the opposite side. Control circuitry 504 may receive a user selection of an arbitrary position, highlighted by the cursor, in the virtual environment (e.g., on the virtual tennis court). Suppose that the selected position is in the audience (e.g., as depicted in second stream 210 (FIG. 2)).

At step 820, control circuitry 504 (FIG. 5) generates for display, using the video game engine data, the viewing contents from the non-curated viewing perspective. For example, control circuitry 504 may change the virtual position of the user and the camera angle based on the requested non-curated viewing perspective. Using the video game engine data, control circuitry 504 may re-render all game objects, audio, graphics and virtual environments associated with the first stream at a new set of positions with respect to the user's new virtual position. This allows the user to view the gameplay from a different perspective (e.g., the non-curated perspective). This process is further discussed in FIGS. 9-10.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 8.

Figure 9:
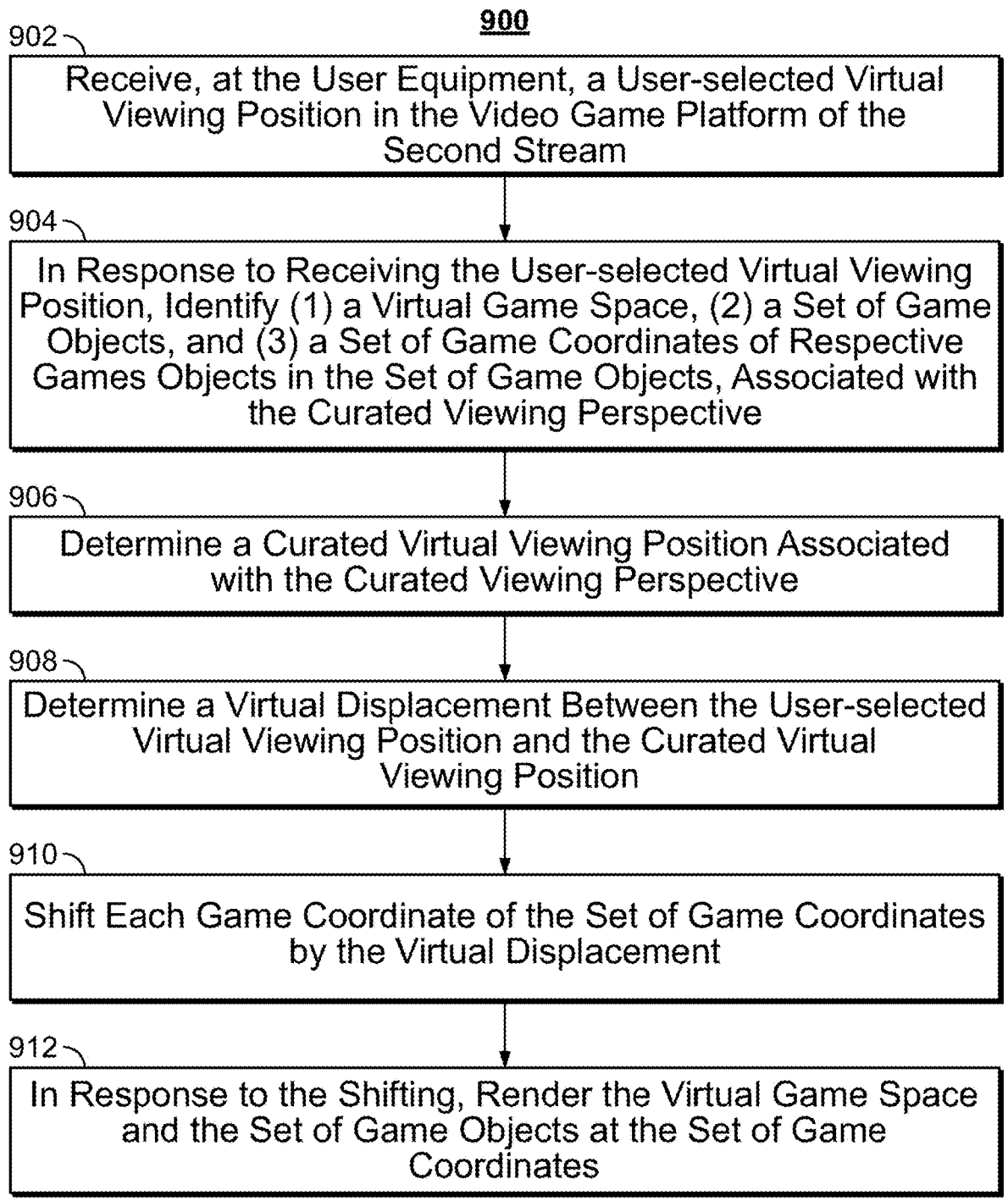
FIG. 9 is a flowchart of a detailed illustrative process for generating the non-curated perspective by shifting the game coordinates associated with the game objects, in accordance with some embodiments of the disclosure.

FIG. 9 is a flowchart of an illustrative process for generating the non-curated perspective by shifting the game coordinates associated with the game objects, in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on a user device (e.g., user equipment devices 602, 604, and/or 606 (FIG. 6)) in order to generate the non-curated perspective by shifting the game coordinates associated with the game objects. In addition, one or more steps of process 900 may be incorporated into or combined with one or more steps of any other process or embodiment (e.g., as described in relation to FIGS. 1-2, 7-8 and 10-16).

At step 902, control circuitry 504 (FIG. 5) receives (e.g., via I/O Path 502 (FIG. 5), at the user equipment, a user-selected virtual viewing position in the video game platform of the second stream. As discussed previously, control circuitry 504 may generate a virtual cursor that points to a game coordinate in the virtual game space. The virtual game space represents the dimensional space used for mapping locations of various game objects. For example, if the virtual game space is three-dimensional (e.g., such as in Tennis World Tour 2018), game objects within the virtual game space will have three coordinates (e.g., an x-coordinate, y-coordinate, and z-coordinate). If the virtual game space is two-dimensional (e.g., such as in Super Mario World), game objects within the virtual game space will have two coordinates (e.g., an x-coordinate and y-coordinate). Through I/O Path 502, the user may move the virtual cursor to any arbitrary position in the virtual game space. For example, given that Tennis World Tour 2018 is a three-dimensional game, control circuitry 504 may receive a user-selected virtual viewing position when the user shifts the virtual cursor to the coordinates (4, 5, 2). These coordinates may be in arbitrary units (e.g., meters, inches, pixels, etc.). It is possible that there are no game objects in that position, or a game object such as the net, a player, an audience member, the floor, etc., are positioned at the user-selected virtual viewing position.

At step 904, control circuitry 504 (FIG. 5) identifies a virtual game space, a set of game objects, and a set of game coordinates of respective games objects in the set of game objects, associated with the curated viewing perspective. For example, the curated viewing perspective may be associated with a position at the coordinates (0, 0, 0). Suppose that at this position, the viewer of the first stream sees stream 102 (FIG. 1). Control circuitry 504 may identify the virtual game space and the set of game objects. This identification process is further discussed in FIG. 13-14. For example, control circuitry 504 may determine that the virtual game space is a three-dimensional space and the set of game objects include tennis player one, tennis player two, racket one, racket two, tennis ball, tennis net, grain of clay on floor, etc. Furthermore, control circuitry 504 may identify the game coordinates associated with each game object. For example, the point at the center of tennis player one may be at the position (10, −15, 20) with respect to the position associated with the curated viewing perspective. These numbers signify that tennis player one is 10 units to the right, 15 units below and 20 units ahead of the position (0, 0, 0).

At step 906, control circuitry 504 (FIG. 5) determines a curated virtual viewing position associated with the curated viewing perspective. As discussed previously, the curated virtual viewing position is the position (0, 0, 0) associated with the curated viewing perspective. Control circuitry 504 may determine this position based on the video game engine data, or approximate the position by recreating the video game environment in the second stream and adjusting the curated virtual viewing position until the second stream's display matches the first stream's display (e.g., performing image processing to match the second stream's viewing perspective with stream 102 (FIG. 1)). In the latter, control circuitry 504 may capture a screenshot of both streams and determine the differences. Control circuitry 504 may then adjust the curated virtual viewing position until the difference between the respective stream screenshots are minimized.

At step 908, control circuitry 504 (FIG. 5) determines a virtual displacement between the user-selected virtual viewing position and the curated virtual viewing position. For example, if the user-selected virtual viewing position is (4, 5, 2) and the curated virtual viewing position is (0, 0, 0), then the virtual displacement between the two points is (4, 5, 2) (e.g., the difference between each respective coordinate of the two positions). It should be noted that the displacement is associated with a vector that points to the user-selected virtual viewing position.

At step 910, control circuitry 504 (FIG. 5) shifts each game coordinate of the set of game coordinates by the virtual displacement. For example, the position of tennis player one is originally (10, −15, 20) with respect to the curated virtual viewing position. Upon shifting the position by the virtual displacement, the new position becomes (6, −20, 18). The position of the user thus remains stationary. However, all game objects and their respective positions are shifted by the virtual displacement.

At step 912, in response to the shifting, control circuitry 504 (FIG. 5) renders the virtual game space and the set of game objects at the set of game coordinates. For example, once all game objects have been shifted based on the virtual displacement, control circuitry 504 may reload the virtual game space such that the user views the second stream from the user-selected virtual viewing position. The rendering process is further discussed in FIG. 13-14.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 9.

Figure 10:
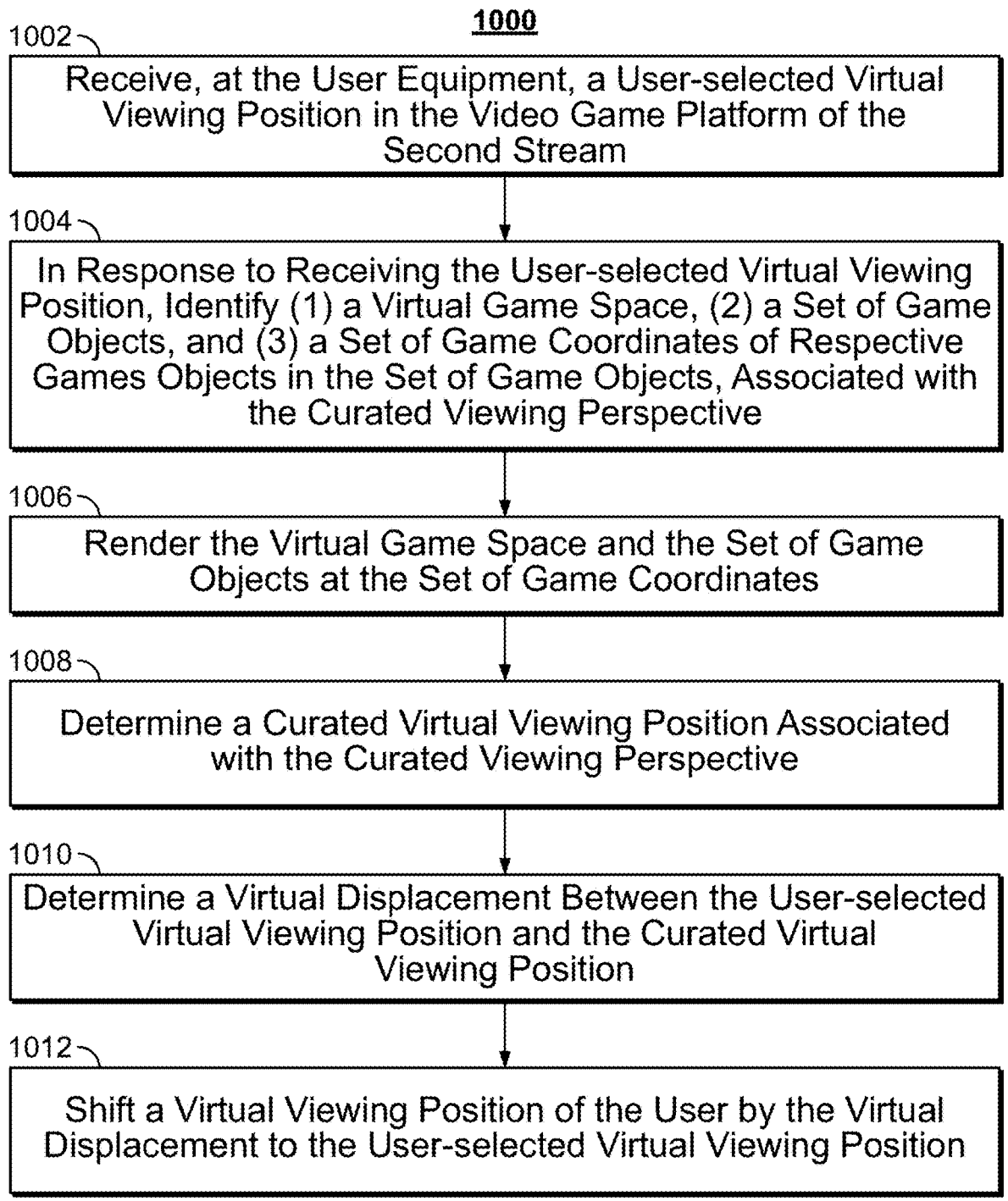
FIG. 10 is a flowchart of a detailed illustrative process for generating the non-curated perspective by shifting the virtual viewing position of the user, in accordance with some embodiments of the disclosure.

FIG. 10 is a flowchart of an illustrative process for generating the non-curated perspective by shifting the virtual viewing position of the user, in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by a media guidance application implemented on a user device (e.g., user equipment devices 602, 604, and/or 606 (FIG. 6)) in order to generate the non-curated perspective by shifting the virtual viewing position of the user. In addition, one or more steps of process 1000 may be incorporated into or combined with one or more steps of any other process or embodiment (e.g., as described in relation to FIGS. 1-2, 7-9 and 11-16).

At step 1002, control circuitry 504 (FIG. 5) receives (e.g., via I/O Path 502 (FIG. 5), at the user equipment, a user-selected virtual viewing position in the video game platform of the second stream. As discussed previously, control circuitry 504 may generate a virtual cursor that points to a game coordinate in the virtual game space. The virtual game space represents the dimensional space used for mapping locations of various game objects. For example, if the virtual game space is three-dimensional (e.g., such as in Tennis World Tour 2018), game objects within the virtual game space will have three coordinates (e.g., an x-coordinate, y-coordinate, and z-coordinate). If the virtual game space is two-dimensional (e.g., such as in Super Mario World), game objects within the virtual game space will have two coordinates (e.g., an x-coordinate and y-coordinate). Through I/O Path 502, the user may move the virtual cursor to any arbitrary position in the virtual game space. For example, given that Tennis World Tour 2018 is a three-dimensional game, control circuitry 504 may receive a user-selected virtual viewing position when the user shifts the virtual cursor to the coordinates (4, 5, 2). These coordinates may be in arbitrary units (e.g., meters, inches, pixels, etc.). It is possible that there are no game objects in that position, or a game object such as the net, a player, an audience member, the floor, etc., are positioned at the user-selected virtual viewing position.

At step 1004, control circuitry 504 (FIG. 5) identifies a virtual game space, a set of game objects, and a set of game coordinates of respective games objects in the set of game objects, associated with the curated viewing perspective. For example, the curated viewing perspective may be associated with a position at the coordinates (0, 0, 0). Suppose that at this position, the viewer of the first stream sees stream 102 (FIG. 1). Control circuitry 504 may identify the virtual game space and the set of game objects. This identification process is further discussed in FIG. 13-14. For example, control circuitry 504 may determine that the virtual game space is a three-dimensional space and the set of game objects include tennis player one, tennis player two, racket one, racket two, tennis ball, tennis net, grain of clay on floor, etc. Furthermore, control circuitry 504 may identify the game coordinates associated with each game object. For example, the point at the center of tennis player one may be at the position (10, −15, 20) with respect to the position associated with the curated viewing perspective. These numbers signify that tennis player one is 10 units to the right, 15 units below and 20 units ahead of the position (0, 0, 0).

At step 1006, control circuitry 504 (FIG. 5) renders the virtual game space and the set of game objects at the set of game coordinates. Control circuitry 504 may load the virtual game space such that the user views the second stream from the user-selected virtual viewing position in the video game platform. The rendering process is further discussed in FIG. 13-14.

At step 1008, control circuitry 504 (FIG. 5) determines a curated virtual viewing position associated with the curated viewing perspective. As discussed previously, the curated virtual viewing position is the position (0, 0, 0) associated with the curated viewing perspective. Control circuitry 504 may determine this position based on the video game engine data, or approximate the position by recreating the video game environment in the second stream and adjusting the curated virtual viewing position until the second stream's display matches the first stream's display (e.g., performing image processing to match the second stream's viewing perspective with stream 102 (FIG. 1)). In the latter, control circuitry 504 may capture a screenshot of both streams and determine the differences. Control circuitry 504 may then adjust the curated virtual viewing position until the difference between the respective stream screenshots are minimized.

At step 1010, control circuitry 504 (FIG. 5) determines a virtual displacement between the user-selected virtual viewing position and the curated virtual viewing position. For example, if the user-selected virtual viewing position is (4, 5, 2) and the curated virtual viewing position is (0, 0, 0), then the virtual displacement between the two points is (4, 5, 2) (e.g., the difference between each respective coordinate of the two positions). It should be noted that the displacement is associated with a vector that points to the user-selected virtual viewing position.

At step 1012, control circuitry 504 (FIG. 5) shifts a virtual viewing position of the user by the virtual displacement to the user-selected virtual viewing position. For example, the position of the user is originally (0, 0, 0) based on the curated virtual viewing position. Upon shifting the virtual viewing position by the virtual displacement, the new position becomes (4, 5, 2). The position of the game objects thus remains stationary.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 10.

Figure 11:
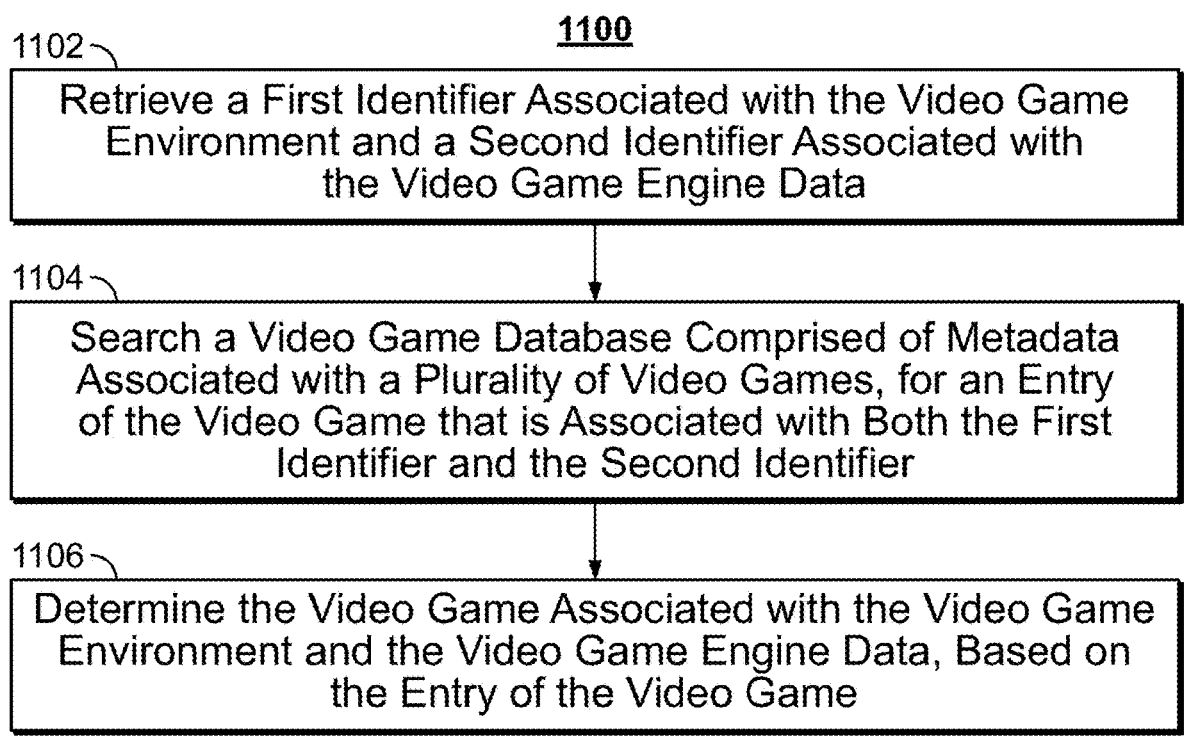
FIG. 11 is a flowchart of a detailed illustrative process for determining the video game associated with the video game environment and the video game engine data, in accordance with some embodiments of the disclosure.

FIG. 11 is a flowchart of an illustrative process for determining the video game associated with the video game environment and the video game engine data, in accordance with some embodiments of the disclosure. It should be noted that process 1100 or any step thereof could be performed on, or provided by, any of the devices shown in FIGS. 5-6. For example, process 1100 may be executed by control circuitry 504 (FIG. 5) as instructed by a media guidance application implemented on a user device (e.g., user equipment devices 602, 604, and/or 606 (FIG. 6)) in order to determine the video game associated with the video game environment and the video game engine data. In addition, one or more steps of process 1100 may be incorporated into or combined with one or more steps of any other process or embodiment (e.g., as described in relation to FIGS. 1-2, 7-10 and 12-16).

At step 1102, control circuitry 504 (FIG. 5) retrieves a first identifier associated with the video game environment and a second identifier associated with the video game engine data. The first identifier and second identifier may be metadata such as a keyword, an image, a title, an audio clip, a game object, code, etc.

At step 1104, control circuitry 504 (FIG. 5) searches a video game database comprised of metadata associated with a plurality of video games, for an entry of the video game that is associated with both the first identifier and the second identifier. The video game database may be found in storage 508 (FIG. 5) or a remote server connected to control circuitry 504 via communication network 614 (FIG. 6). Furthermore, the video game database may include entries of various video games. For each entry, the video game database may include metadata such as title, developer, release date, genre, associated characters, graphics, audio clips, and game code. For example, control circuitry 504 may search for the first and second identifiers, which may be a screenshot and a title respectively. Control circuitry 504 may perform image processing, sound processing or textual comparisons to identify metadata in the video game database that correspond to the first and second identifiers. In some embodiments, control circuitry 504 may compare the correspondence, which may be a quantitative or a qualitative value, to a predetermined threshold. If the correspondence between the metadata and at least one of the first identifier or second identifier is greater than or equal to the threshold, control circuitry 504 may determine that the first and second identifiers correspond to the metadata for a particular entry of a video game. In some embodiments, the threshold may vary based on the metadata that is being compared. For example, an audio sample comparison may be associated with a threshold at 80% (e.g., the samples being compared should have at least an 80% correlation), whereas a textual comparison of a game title may be associated with a threshold at 100% (e.g., the titles need to match exactly).

At step 1106, control circuitry 504 (FIG. 5) determines the video game associated with the video game environment and the video game engine data, based on the entry of the video game. For example, in response to determining that the first identifier and the second identifier (e.g., the screenshot and the title, respectively) match the metadata of an entry in the video game database. Control circuitry 504 may identify the name of the entry and thus determine the video game associated with the video game environment and the video game engine data.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 11.

Figure 12:
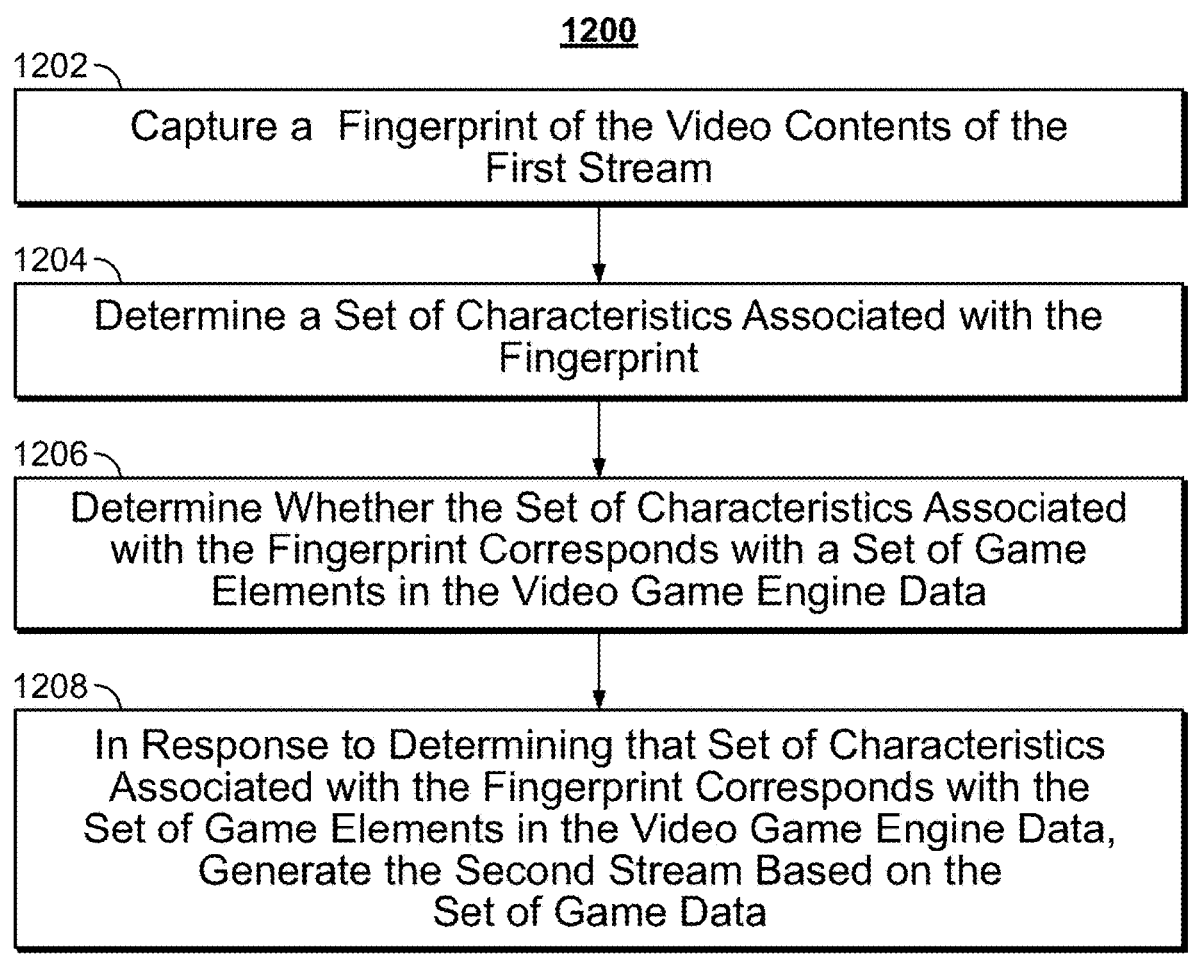
FIG. 12 is a flowchart of a detailed illustrative process for generating the second stream based on the set of game data, in accordance with some embodiments of the disclosure.

FIG. 12 is a flowchart of an illustrative process for generating the second stream based on the set of game data, in accordance with some embodiments of the disclosure. It should be noted that process 1200 or any step thereof could be performed on, or provided by, any of the devices shown in FIGS. 5-6. For example, process 1200 may be executed by control circuitry 504 (FIG. 5) as instructed by a media guidance application implemented on a user device (e.g., user equipment devices 602, 604, and/or 606 (FIG. 6)) in order to generate the second stream based on the set of game data. In addition, one or more steps of process 1200 may be incorporated into or combined with one or more steps of any other process or embodiment (e.g., as described in relation to FIGS. 1-2, 7-11 and 13-16).

At step 1202, control circuitry 504 (FIG. 5) captures a fingerprint of the video contents of the first stream. The fingerprint of the video contents may be an image capture of a set of frames of the video contents. The fingerprint may include an audio clip associated with the set of frames. The fingerprint may also take include input video game commands associated with the gameplay in the set of frames. As discussed previously, these input video game commands may be retrieved from the video game engine data.

At step 1204, control circuitry 504 (FIG. 5) determines a set of characteristics associated with the fingerprint. For example, control circuitry 504 may use object recognition to identify objects in the set of frames. These objects may include the tennis players, the court, the net, the tennis ball, etc. Control circuitry 504 may also perform sound recognition to isolate various sounds in the audio clip. For example, the sounds may be of the tennis ball being hit, the crowd, the players, the commentators, etc. Control circuitry 504 may map the input video game commands to the objects and sounds. These methods of determining the set of characteristics is further discussed in the description of FIG. 13.

At step 1206, control circuitry 504 (FIG. 5) determines whether the set of characteristics associated with the fingerprint corresponds with a set of game elements in the video game engine data. For example, one characteristic in the set of characteristics may be a tennis player (e.g., identified in the first stream using object recognition). Control circuitry 504 may thus label the object with an identifier such as "tennis player." In some embodiments, control circuitry 504 may associate additional details with the tennis player. For example, control circuitry 504 may recognize that the tennis player is Roger Federer and is wearing a blue shirt with black shorts. The game elements in the video game engine data may be graphics, audio, game code, etc. Control circuitry 504 may determine whether there are any game elements associated with Roger Federer in the video game engine data. For example, control circuitry 504 may identify code in the video game engine data that can render Roger Federer in the virtual game space. The code may also reference the black shirt and black shorts attire, audio clips of Roger Federer, game mechanics that are associated with his movement, etc., which are also found in the video game engine data. Accordingly, control circuitry 504 may determine that the characteristic "Roger Federer" is associated with a game element (e.g., game code) that can be used to render an in-game version of the characteristic.

At step 1208, in response to determining that set of characteristics associated with the fingerprint corresponds with the set of game elements in the video game engine data, control circuitry 504 (FIG. 5) generates the second stream based on the set of game data. For example, control circuitry 504 may identify game elements that correspond to each characteristic identified with the set of characteristics. In the case "Tennis World Tour 2018," for a particular set of frames, characteristics such as "Roger Federer," "tennis ball," and "tennis net" may be respectively associated with game elements such as game code that can render the characteristics in-game, graphics, and audio clips. The game elements are then rendered in the video game platform and generated for display as the second stream.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 12.

Figure 13:
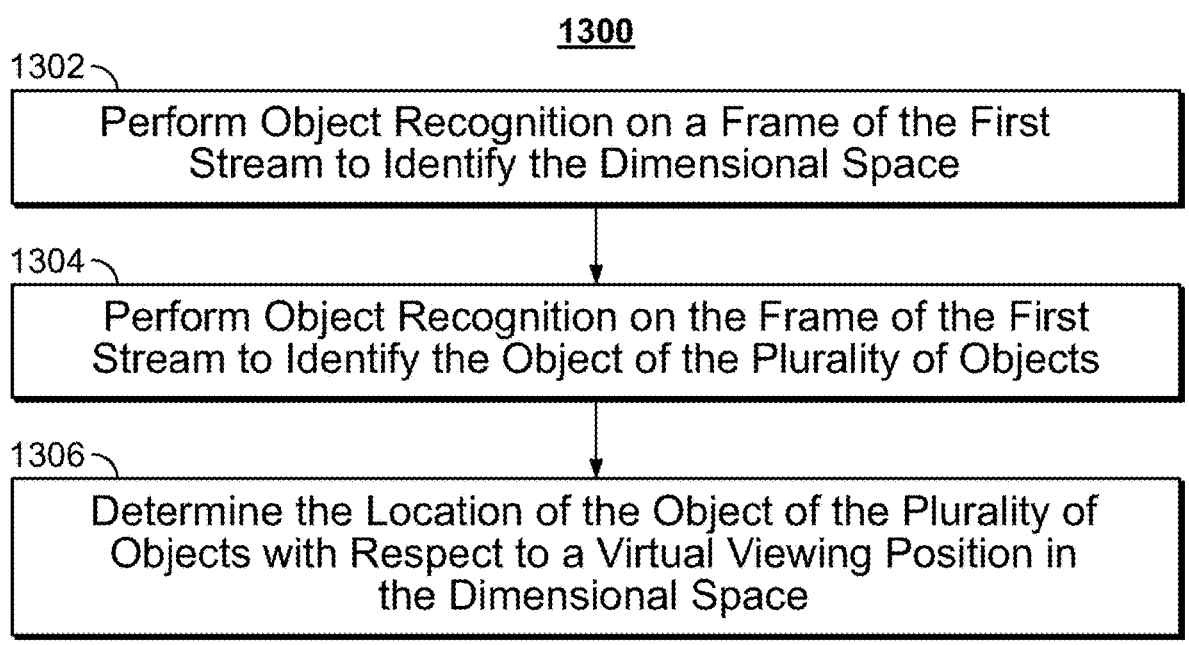
FIG. 13 is a flowchart of a detailed illustrative process for determining the set of characteristics associated with the fingerprint, in accordance with some embodiments of the disclosure.

FIG. 13 is a flowchart of an illustrative process for determining the set of characteristics associated with the fingerprint, in accordance with some embodiments of the disclosure. It should be noted that process 1300 or any step thereof could be performed on, or provided by, any of the devices shown in FIGS. 5-6. For example, process 1300 may be executed by control circuitry 504 (FIG. 5) as instructed by a media guidance application implemented on a user device (e.g., user equipment devices 602, 604, and/or 606 (FIG. 6)) in order to determine the set of characteristics associated with the fingerprint. In addition, one or more steps of process 1300 may be incorporated into or combined with one or more steps of any other process or embodiment (e.g., as described in relation to FIGS. 1-2, 7-12 and 14-16).

At step 1302, control circuitry 504 (FIG. 5) performs object recognition on a frame of the first stream to identify the dimensional space. This step is only needed if the video game engine data does not indicate the dimensional space. Accordingly, control circuitry 504 may determine whether the first stream is depicting a three-dimensional space (e.g., a tennis court) or a two-dimensional space (e.g., a side scrolling environment such as in Super Mario World). In order to identify the dimensional space, control circuitry 504 may utilize a combination of computer vision and machine learning. More specifically, control circuitry 504 may use the frame of the first stream as an input to a machine learning algorithm that outputs a depth map. The machine learning algorithm may be pre-trained using a variety of images and dimensional data associated with the images. An algorithm trained to identify how objects in an image appear, based on the dimensions of the space depicted in the image, may output the identity of the dimensional space. For example, the algorithm, as implemented by control circuitry 504, may detect features such as the position of various objects in the frame and determine a depth map accordingly. If the depth map is described in three dimensions (e.g., via an x-coordinate, a y-coordinate and a z-coordinate), control circuitry 504 may determine that the dimensional space is three-dimensional. If the depth map is described in two dimensions, control circuitry 504 may determine that the dimensional space is two-dimensional.

At step 1304, control circuitry 504 (FIG. 5) performs object recognition on the frame of the first stream to identify the object of the plurality of objects. For example, control circuitry 504 may utilize image processes such as segmentation to identify pixels in the frame that can be grouped to form an object. In response to segmenting the frame, control circuitry 504 may compare the segmented pixels to images in an image database stored in storage 508 (FIG. 5) or in a remote server. The image database may contain images of various objects and identify them with names. For example, control circuitry 504 may segment a group of pixels in the frame of the first stream that form a tennis ball. Control circuitry 504 may compare those segmented pixels to the images in the image database and determine a correspondence with an image of a tennis ball. In response to determining the match, control circuitry 504 may classify the segmented pixels based on the name of the image that matched the segmented pixels.

At step 1306, control circuitry 504 (FIG. 5) determines the location of the object of the plurality of objects with respect to a virtual viewing position in the dimensional space. For example, control circuitry 504 may utilize the depth map from step 1302 to determine the positions of the objects with relative to each other. For example, the depth map may indicate that the first tennis player is at a position (1, 2, 1) and the second tennis player is at (−5, 2, 5). These values indicate that the second tennis player is 6 units to the left and 4 units ahead of the first tennis player. As mentioned previously, these units may be arbitrary (e.g., virtual inches, meters, pixels, etc.). The y-coordinate signifies that both tennis players are at the same elevation.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 13.

Figure 14:
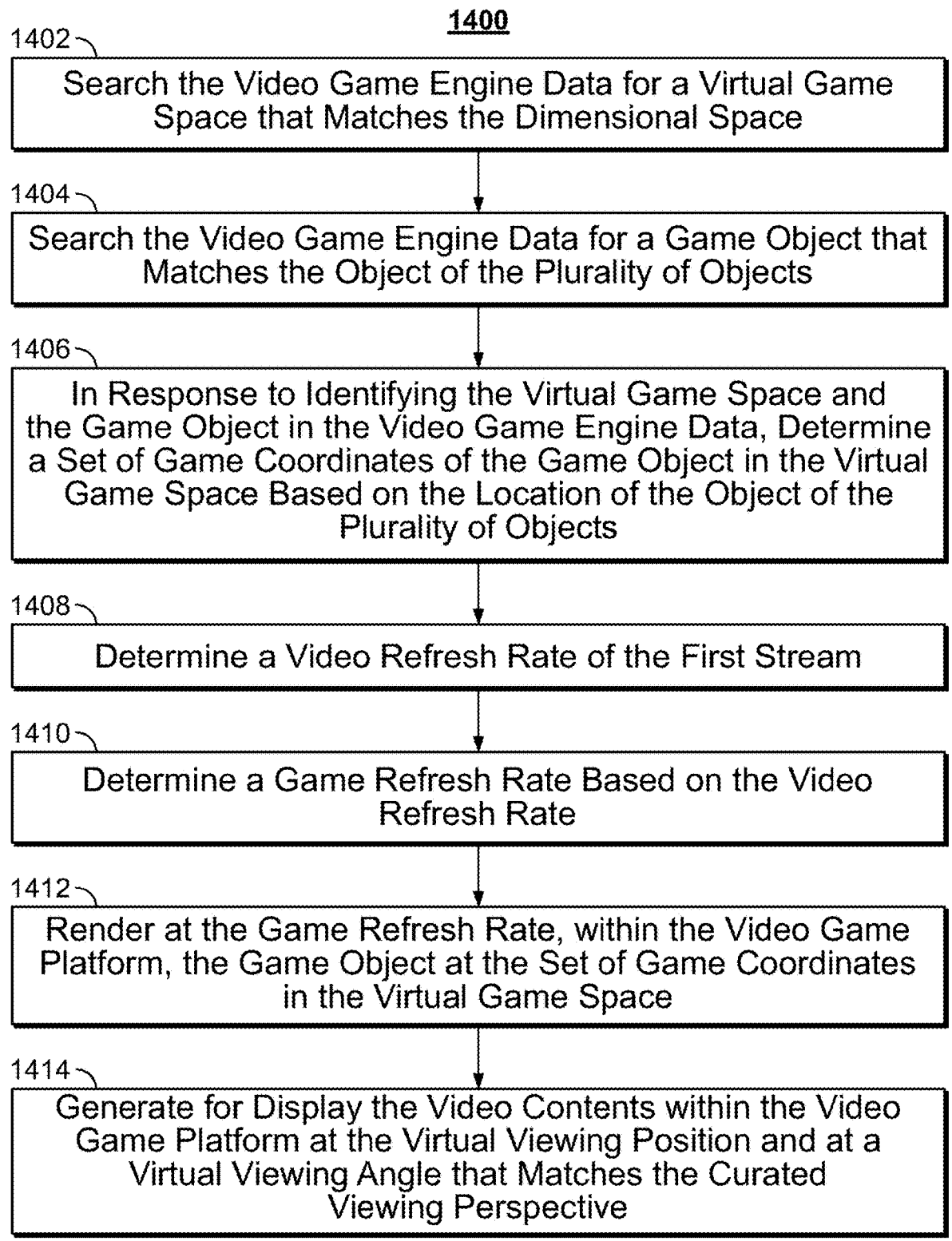
FIG. 14 is a flowchart of a detailed illustrative process for generating the video contents of the second stream in the video game platform, in accordance with some embodiments of the disclosure.

FIG. 14 is a flowchart of an illustrative process for generating the video contents of the second stream in the video game platform, in accordance with some embodiments of the disclosure. It should be noted that process 1400 or any step thereof could be performed on, or provided by, any of the devices shown in FIGS. 5-6. For example, process 1400 may be executed by control circuitry 504 (FIG. 5) as instructed by a media guidance application implemented on a user device (e.g., user equipment devices 602, 604, and/or 606 (FIG. 6)) in order to generate the video contents of the second stream in the video game platform. In addition, one or more steps of process 1400 may be incorporated into or combined with one or more steps of any other process or embodiment (e.g., as described in relation to FIGS. 1-2, 7-13 and 15-16).

At step 1402, control circuitry 504 (FIG. 5) searches the video game engine data for a virtual game space that matches the dimensional space. The dimensional space is associated with the first stream and the virtual game space is associated with the second stream. For example, in response to determining that the first stream is associated with a three-dimensional space, control circuitry 504 may search the video game engine data for code that describes three-dimensional objects and environments. In response to determining that the video game engine data is associated with three-dimensional objects and rendering, control circuitry 504 may determine that the virtual game space of the video game is expressed in three dimensions.

At step 1404, control circuitry 504 (FIG. 5) searches the video game engine data for a game object that matches the object of the plurality of objects. For example, control circuitry 504 may label the object with an identifier such as "tennis player one." In some embodiments, control circuitry 504 may associate additional details with tennis player one. For example, control circuitry 504 may recognize that tennis player one is Roger Federer and is wearing a blue shirt with black shorts. The game elements in the video game engine data may be graphics, audio, game code, etc. Control circuitry 504 may determine whether there are any game elements associated with Roger Federer in the video game engine data. For example, control circuitry 504 may identify code in the video game engine data that can render Roger Federer in the virtual game space. The code may also reference the black shirt and black shorts attire, audio clips of Roger Federer, game mechanics that are associated with his movement, etc., which are also found in the video game engine data. Accordingly, control circuitry 504 may determine that object "tennis player one" is associated with a specific game element (e.g., game code) that can be used to render an in-game version of the object.

At step 1406, in response to identifying the virtual game space and the game object in the video game engine data, control circuitry 504 (FIG. 5) determines a set of game coordinates of the game object in the virtual game space based on the location of the object of the plurality of objects. As discussed previously, the location of the objects in the plurality of objects are relative to any arbitrary object identified in the first stream. In order to determine game coordinates, control circuitry 504 may first retrieve the virtual viewing position from the video game engine data. For example, video game engine data may indicate a default virtual viewing position that the game initializes the video game environment around. In addition, control circuitry 504 may determine the default position of a game object such as tennis player one. Control circuitry 504 may determine the displacement between the game object and the virtual viewing position. Suppose that the virtual viewing position is at an origin (0, 0, 0) and the game object is at the coordinate (0, −15, 20). This signifies that when the video game is normally rendered, tennis player one is always 15 units below and 20 units ahead of the virtual viewing position. Using the locations/positions of the plurality of objects relative to the object "tennis player one" in the first stream, control circuitry 504 may calculate the game coordinates of the game objects relative to the game object, tennis player one. For example, if the virtual displacement between tennis player one and tennis player two is (−1, 0, 40) in the first stream, control circuitry 504 may determine that the displacement between the respective game objects is proportional to (−1, 0, 40) in the virtual game space.

At step 1408, control circuitry 504 (FIG. 5) determines a video refresh rate of the first stream. For example, control circuitry 504 may refer to the metadata of the first stream, as retrieved from the media guidance data source 618 (FIG. 6), to determine the amount of frames per second transmitted in the first stream.

At step 1410, control circuitry 504 (FIG. 5) determines a game refresh rate based on the video refresh rate. For example, control circuitry 504 may retrieve a refresh rate in the video game engine data. This refresh rate may indicate the amount of frames in a period of time that can be presented to a user accessing the video game (e.g. 60 Hz). The video refresh rate may be different from this refresh rate because of streaming conditions associated with receiving the first stream (e.g., 50 Hz). Control circuitry 504 may thus determine a game refresh rate whose value is equal to one of the refresh rates or is between the two refresh rates (e.g., 45 Hz).

At step 1412, control circuitry 504 (FIG. 5) render at the game refresh rate, within the video game platform, the game object at the set of game coordinates in the virtual game space. For example, control circuitry 504 may execute the game code provided in the video game engine data to render the game objects at their respective game coordinates. Furthermore, control circuitry 504 may monitor the first stream and re-render the game objects based on the game refresh rate. Thus, if the game refresh rate transmits 45 frames per second, control circuitry 504 may monitor for changes in the first stream for each frame and re-render accordingly.

At step 1414, control circuitry 504 (FIG. 5) generates for display the video contents within the video game platform at the virtual viewing position and at a virtual viewing angle that matches the curated viewing perspective. The virtual viewing angle may be a vector that points in a specific direction in the virtual game space. For example, from the virtual viewing position (0, 0, 0), the vector may point to the coordinate (0, −15, 30) (e.g., the center of the virtual tennis net). Therefore, the virtual viewing angle focus the curated viewing perspective to the court. If the virtual viewing angle is associated with a vector pointing to the game coordinate (0, −15, −30), the curated viewing perspective may be focused in the opposite direction (e.g., towards the virtual audience in the stands behind the court).

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 14.

Figure 15:
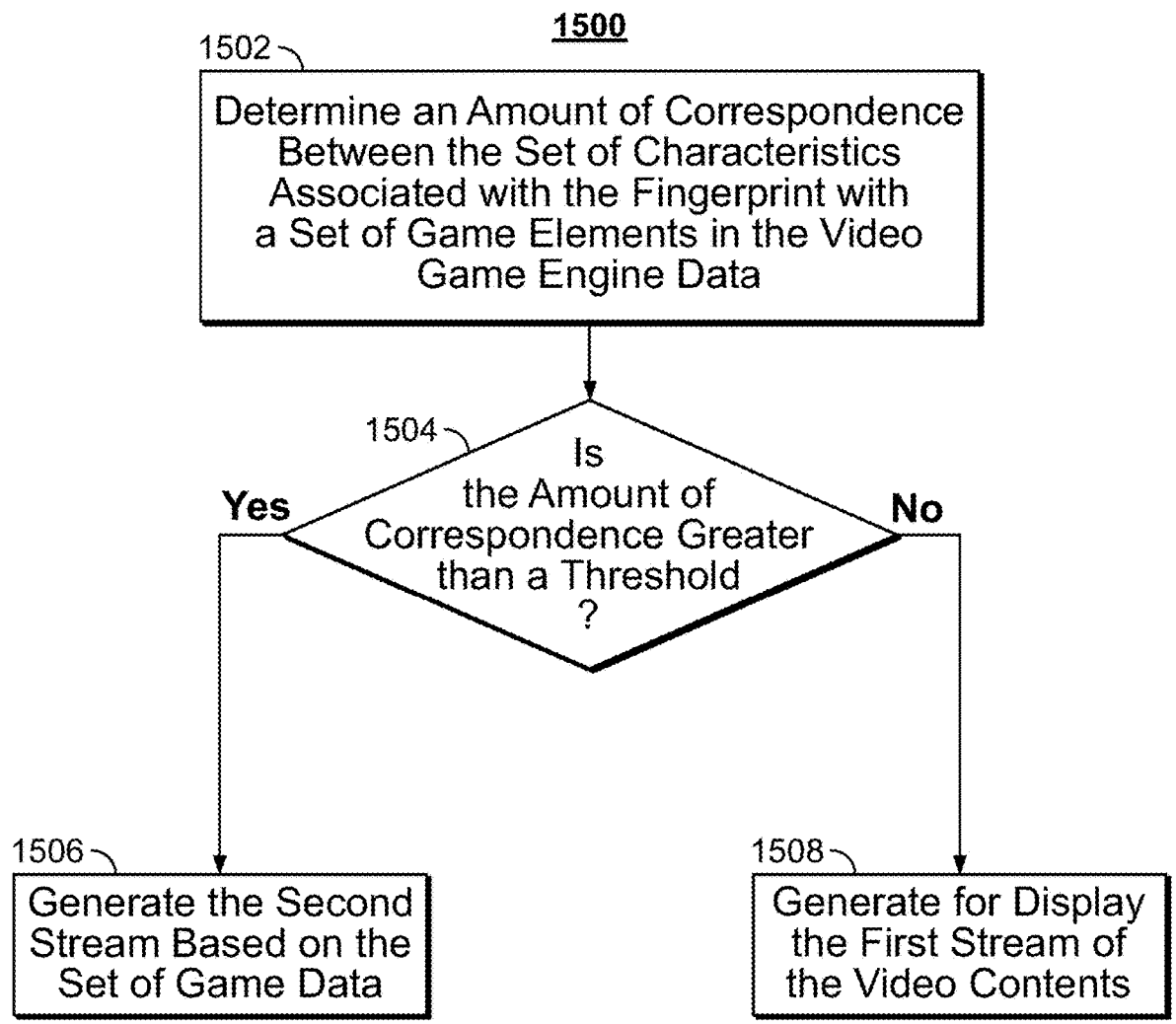
FIG. 15 is a flowchart of a detailed illustrative process for generating the video contents of the second stream in the video game platform, in accordance with some embodiments of the disclosure.

FIG. 15 is a flowchart of an illustrative process for generating the video contents of the second stream in the video game platform, in accordance with some embodiments of the disclosure. It should be noted that process 1500 or any step thereof could be performed on, or provided by, any of the devices shown in FIGS. 5-6. For example, process 1500 may be executed by control circuitry 504 (FIG. 5) as instructed by a media guidance application implemented on a user device (e.g., user equipment devices 602, 604, and/or 606 (FIG. 6)) in order to generate the video contents of the second stream in the video game platform. In addition, one or more steps of process 1500 may be incorporated into or combined with one or more steps of any other process or embodiment (e.g., as described in relation to FIGS. 1-2, 7-14 and 16).

At step 1502, control circuitry 504 (FIG. 5) determines an amount of correspondence between the set of characteristics associated with the fingerprint with a set of game elements in the video game engine data
The amount of correspondence may be quantitative (e.g., a percentage, a fraction, a normalized correlation, etc.) or qualitative (e.g., "similar," "not similar," "exact match," "no match"). Suppose the set of characteristics comprise of graphics, audio files, and textual information. The set of game elements may comprise of mathematical models, graphics, audio, and text. Control circuitry 504 may compare each characteristic with each game element and determine a respective amount of correspondence for each pair of characteristics and game elements. Suppose the amount of correspondence between a characteristic and a game element is 80%.

At step 1504, control circuitry 504 (FIG. 5) determines whether the amount of correspondence is greater than a threshold. The threshold may be a pre-determined value stored in storage 508 (FIG. 5). The threshold may also be a qualitative or quantitative value. For example, the threshold may be 70%.

At step 1506, in response to determining that the amount of correspondence is greater than the threshold, control circuitry 504 (FIG. 5) generates the second stream based on the set of game data. This is further described in the description of FIG. 14.

At step 1508, in response to determining that the amount of correspondence is less than the threshold, control circuitry 504 (FIG. 5) generates for display the first stream of the video contents. In this case, control circuitry 504 is unable to match the characteristics of the first stream with the game elements in the video game engine data. Therefore, control circuitry 504 simply generates for display the first stream and does not attempt to generate the second stream.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 15.

Figure 16:
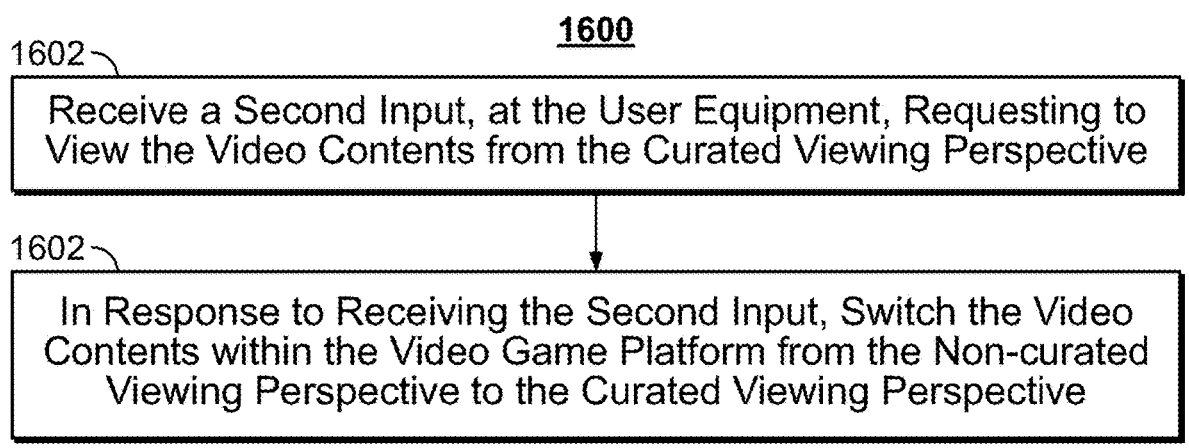
FIG. 16 is a flowchart of a detailed illustrative process for switching the video contents within the video game platform from the non-curated viewing perspective to the curated viewing perspective, in accordance with some embodiments of the disclosure.

FIG. 16 is a flowchart of an illustrative process for switching the video contents within the video game platform from the non-curated viewing perspective to the curated viewing perspective, in accordance with some embodiments of the disclosure. It should be noted that process 1600 or any step thereof could be performed on, or provided by, any of the devices shown in FIGS. 5-6. For example, process 1600 may be executed by control circuitry 504 (FIG. 5) as instructed by a media guidance application implemented on a user device (e.g., user equipment devices 602, 604, and/or 606 (FIG. 6)) in order to switch the video contents within the video game platform from the non-curated viewing perspective to the curated viewing perspective. In addition, one or more steps of process 1600 may be incorporated into or combined with one or more steps of any other process or embodiment (e.g., as described in relation to FIGS. 1-2 and 7-15).

At step 1602, control circuitry 504 (FIG. 5) receives a second input (e.g., via I/O Path 502 (FIG. 5)), at the user equipment, requesting to view the video contents from the curated viewing perspective. For example, control circuitry 504 may generate for display an option for the user to switch back to the curated viewing perspective. In this case, the user may select that option.

At step 1604, in response to receiving the second input, control circuitry 504 (FIG. 5) switches the video contents within the video game platform from the non-curated viewing perspective to the curated viewing perspective. For example, control circuitry 504 may re-render all game objects at respective game coordinates relative to the curated virtual viewing position.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 16.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
receiving a first stream depicting footage of a video game;
identifying the video game;
accessing video game code locally for a particular object of the video game;
generating the particular object using the video game code; and
generating for display a second stream depicting the particular object.

2. The method of claim 1, wherein the first stream and the second stream are simultaneously generated for display.

3. The method of claim 1, wherein the particular object is depicted in the footage of the video game.

4. The method of claim 1, further comprising:
receiving user input,
wherein accessing the video game code and generating the particular object using the video game code is performed in response to receiving the user input.

5. The method of claim 1, wherein the video game code is executable to render the particular object in a virtual game space of the second stream.

6. The method of claim 5, further comprising:
identifying the virtual game space by determining, based on the video game code, that one or more characteristics of the virtual game space match one or more characteristics of dimensional space associated with the first stream.

7. The method of claim 1, further comprising identifying the video game and determining the video game code by:
retrieving a first identifier associated with the video game of the first stream and a second identifier associated with the video game code;
searching a video game database comprised of metadata associated with a plurality of video games, for an entry of the video game that is associated with both the first identifier and the second identifier; and
identifying the video game and the video game code, based on the entry of the video game.

8. The method of claim 1, wherein the particular object is depicted in the footage of the video game, the method further comprising:

determining that one or more characteristics of the particular object of the first stream match one or more characteristics of the particular object specified in the video game code,
wherein generating for display the second stream is performed based at least in part on the determining.

9. The method of claim 1, further comprising:
determining a location of the particular object in dimensional space of the first stream,
wherein generating for display the second stream is performed based at least in part on the determining.

10. The method of claim 1, further comprising:
determining a video refresh rate associated with the first stream;
wherein generating for display the second stream is performed based at least in part on the determining.

11. A computer-implemented system comprising:
memory;
control circuitry configured to:
receive a first stream depicting footage of a video game;
identify the video game;
access video game code locally for a particular object of the video game, wherein the video game code is stored in the memory;
generate the particular object using the video game code; and
generate for display a second stream depicting the particular object.

12. The system of claim 11, wherein the first stream and the second stream are simultaneously generated for display.

13. The system of claim 11, wherein the particular object is depicted in the footage of the video game.

14. The system of claim 11, wherein the control circuitry is further configured to:
receive user input; and
perform the accessing of the video game code and the generating of the particular object using the video game code in response to receiving the user input.

15. The system of claim 11, wherein the video game code is executable to render the particular object in a virtual game space of the second stream.

16. The system of claim 15, wherein the control circuitry is further configured to:
identify the virtual game space by determining, based on the video game code, that one or more characteristics of the virtual game space match one or more characteristics of dimensional space associated with the first stream.

17. The system of claim 11, wherein the control circuitry is further configured to identify the video game and determine the video game code by:
retrieving a first identifier associated with the video game of the first stream and a second identifier associated with the video game code;
searching a video game database comprised of metadata associated with a plurality of video games, for an entry of the video game that is associated with both the first identifier and the second identifier; and
identifying the video game and the video game code, based on the entry of the video game.

18. The system of claim 11, wherein the particular object is depicted in the footage of the video game, and the control circuitry is further configured to:

determine that one or more characteristics of the particular object of the first stream match one or more characteristics of the particular object specified in the video game code; and generate for display the second stream based at least in part on the determining.

19. The system of claim 11, wherein the control circuitry is further configured to:

determine a location of the particular object in dimensional space of the first stream; and generate for display the second stream based at least in part on the determining.

20. The system of claim 11, wherein the control circuitry is further configured to:

determine a video refresh rate associated with the first stream;

generate for display the second stream is performed based at least in part on the determining.

* * * * *